United States Patent
Nakagawa et al.

(10) Patent No.: US 12,272,145 B2
(45) Date of Patent: Apr. 8, 2025

(54) INFORMATION PROCESSING APPARATUS, INFORMATION PROCESSING METHOD, AND PROGRAM

(71) Applicant: NEC Corporation, Tokyo (JP)

(72) Inventors: Junko Nakagawa, Tokyo (JP); Ryoma Oami, Tokyo (JP); Kenichiro Ida, Tokyo (JP); Mika Saito, Tokyo (JP); Shohzoh Nagahama, Tokyo (JP); Akinari Furukawa, Tokyo (JP); Yasumasa Ohtsuka, Tokyo (JP); Junichi Fukuda, Tokyo (JP); Fumi Ikeda, Tokyo (JP); Manabu Moriyama, Tokyo (JP); Fumie Einaga, Tokyo (JP); Tatsunori Yamagami, Tokyo (JP); Keisuke Hirayama, Tokyo (JP); Yoshitsugu Kumano, Tokyo (JP); Hiroki Adachi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/502,454

(22) Filed: Nov. 6, 2023

(65) Prior Publication Data
US 2024/0071087 A1 Feb. 29, 2024

Related U.S. Application Data

(63) Continuation of application No. 17/471,900, filed on Sep. 10, 2021, now Pat. No. 12,183,082, which is a
(Continued)

(30) Foreign Application Priority Data

Jan. 29, 2016 (JP) .................................. 2016-015713

(51) Int. Cl.
*G06K 9/00* (2022.01)
*G06V 20/40* (2022.01)
(Continued)

(52) U.S. Cl.
CPC .............. *G06V 20/52* (2022.01); *G06V 20/41* (2022.01); *G06V 20/46* (2022.01); *G06V 40/10* (2022.01);
(Continued)

(58) Field of Classification Search
CPC ........... G06K 9/00771; G06K 9/00718; G06K 2009/00738; G06K 9/00744;
(Continued)

(56) References Cited

U.S. PATENT DOCUMENTS 6,028,626 A * 2/2000 Aviv ................ G08B 13/19602
382/118
7,447,332 B2 11/2008 Horii et al.
(Continued)

FOREIGN PATENT DOCUMENTS

EP 2779130 A2 9/2014
JP 2003-085662 A 3/2003
(Continued)

OTHER PUBLICATIONS

US Office Action for U.S. Appl. No. 18/502,390, mailed on Sep. 9, 2024.
(Continued)

Primary Examiner — Hadi Akhavannik
(74) Attorney, Agent, or Firm — Michael Dryja

(57) ABSTRACT

An information processing apparatus (10) includes a time and space information acquisition unit (110) that acquires high-risk time and space information indicating a spatial region with an increased possibility of an accident occurring or of a crime being committed and a corresponding time slot, a possible surveillance target acquisition unit (120) that identifies a video to be analyzed from among a plurality of videos generated by capturing an image of each of a plurality of places, on the basis of the high-risk time and space
(Continued)

information, and analyzes the identified video to acquire information of a possible surveillance target, and a target time and space identification unit (130) that identifies at least one of a spatial region where surveillance is to be conducted which is at least a portion of the spatial region or a time slot when surveillance is to be conducted, from among the spatial region and the time slot indicated by the high-risk time and space information, on the basis of the information of the possible surveillance target.

12 Claims, 13 Drawing Sheets

Related U.S. Application Data continuation of application No. 16/073,457, filed as application No. PCT/JP2017/002115 on Jan. 23, 2017, now Pat. No. 11,494,579.

(51) Int. Cl.
   *G06V 20/52* (2022.01)
   *G06V 40/10* (2022.01)
(52) U.S. Cl.
   CPC ...... *G06V 2201/07* (2022.01); *G06V 2201/08* (2022.01)
(58) Field of Classification Search
   CPC ............. G06K 9/00369; G06K 9/6253; G06K 9/6262; G06K 9/00221; G06K 9/00228; G06K 9/00268; G06K 9/00288; G06K 9/00362; G06K 9/00476
   See application file for complete search history.

(56) References Cited

U.S. PATENT DOCUMENTS

| | | | |
|---|---|---|---|
| 7,571,146 B2 * | 8/2009 | Dalton ................... | G06T 17/05 706/45 |
| 8,564,661 B2 | 10/2013 | Lipton et al. | |
| 8,849,728 B2 | 9/2014 | Ebert et al. | |
| 8,949,164 B1 | 2/2015 | Mohler | |
| 9,268,964 B1 | 2/2016 | Schepis et al. | |
| 10,997,422 B2 | 5/2021 | Nakagawa et al. | |
| 2001/0033330 A1 | 10/2001 | Garoutte | |
| 2004/0130620 A1 * | 7/2004 | Buehler ................ | G06V 40/20 348/E7.086 |
| 2005/0219359 A1 | 10/2005 | Trela | |
| 2006/0028556 A1 | 2/2006 | Bunn et al. | |
| 2007/0112713 A1 | 5/2007 | Seaman et al. | |
| 2007/0165716 A1 * | 7/2007 | Kitamura ............. | H04N 19/433 375/E7.102 |
| 2008/0098068 A1 * | 4/2008 | Ebata .................... | H04L 67/12 709/206 |
| 2008/0309759 A1 * | 12/2008 | Wilson ............... | G08B 13/1968 725/39 |
| 2009/0020002 A1 * | 1/2009 | Williams ............ | F41H 13/0031 89/41.03 |
| 2009/0181640 A1 | 7/2009 | Jones | |
| 2009/0278934 A1 * | 11/2009 | Ecker .................... | G06V 40/25 348/152 |
| 2011/0038535 A1 | 2/2011 | Wang et al. | |
| 2011/0046920 A1 * | 2/2011 | Amis .................... | G08B 27/00 709/217 |
| 2011/0228086 A1 * | 9/2011 | Cordero ........... | G08B 13/19636 348/143 |
| 2011/0261202 A1 | 10/2011 | Goldstein | |
| 2012/0026335 A1 * | 2/2012 | Brown ................... | G06T 7/292 382/103 |
| 2012/0105635 A1 | 5/2012 | Erhardt et al. | |
| 2013/0057551 A1 | 3/2013 | Ebert et al. | |
| 2013/0188842 A1 | 7/2013 | Hauke | |
| 2014/0057590 A1 | 2/2014 | Romero | |
| 2014/0063239 A1 | 3/2014 | Furness, III et al. | |
| 2014/0162598 A1 | 6/2014 | Villa-Real | |
| 2014/0232863 A1 | 8/2014 | Paliga et al. | |
| 2014/0267748 A1 | 9/2014 | Lee | |
| 2014/0354820 A1 | 12/2014 | Danialian et al. | |
| 2015/0036883 A1 * | 2/2015 | Deri ...................... | G06V 20/52 382/103 |
| 2015/0088335 A1 | 3/2015 | Lambert et al. | |
| 2015/0103178 A1 * | 4/2015 | Itoh ........................ | G06V 20/41 348/159 |
| 2015/0124087 A1 | 5/2015 | Jones, Jr. et al. | |
| 2016/0132731 A1 * | 5/2016 | Hisada .................. | G06F 18/40 382/103 |
| 2016/0187477 A1 | 6/2016 | Wang | |
| 2016/0203370 A1 * | 7/2016 | Child .............. | G08B 13/19656 348/143 |
| 2016/0259854 A1 | 9/2016 | Liu et al. | |
| 2017/0069051 A1 | 3/2017 | Petti, Sr. et al. | |
| 2017/0146319 A1 * | 5/2017 | Lyren ................... | F41A 17/063 |
| 2018/0018504 A1 * | 1/2018 | Sotodate ............... | H04N 7/181 |
| 2018/0350213 A1 * | 12/2018 | Bart ....................... | H04N 7/186 |
| 2019/0236374 A1 * | 8/2019 | Nakagawa ............ | G06V 20/46 |
| 2023/0409054 A1 | 12/2023 | Bradley | |

FOREIGN PATENT DOCUMENTS

| | | |
|---|---|---|
| JP | 2003109155 A | 4/2003 |
| JP | 2003-141657 A | 5/2003 |
| JP | 2005-286619 A | 10/2005 |
| JP | 2006-74260 A | 3/2006 |
| JP | 2007-025940 A | 2/2007 |
| JP | 2007-183745 A | 7/2007 |
| JP | 2007-219841 A | 8/2007 |
| JP | 2007-333423 A | 12/2007 |
| JP | 2009-049568 A | 3/2009 |
| JP | 2009-141550 A | 6/2009 |
| JP | 2009140264 A | 6/2009 |
| JP | 2009244956 A | 10/2009 |
| JP | 2010-136032 A | 6/2010 |
| JP | 2010250775 A | 11/2010 |
| JP | 2011243056 A | 12/2011 |
| JP | 2012-021851 A | 2/2012 |
| JP | 2013-065187 A | 4/2013 |
| JP | 2013131153 A | 7/2013 |
| JP | 2014-026506 A | 2/2014 |
| JP | 2014-186560 A | 10/2014 |
| JP | 2014215747 A | 11/2014 |
| JP | 2015139007 A | 7/2015 |
| JP | 2017-049867 A | 3/2017 |
| WO | 2005079178 A2 | 9/2005 |
| WO | 2014058406 A1 | 4/2014 |
| WO | 2016/051686 A1 | 4/2016 |

OTHER PUBLICATIONS

Non-Final Office Action dated Sep. 11, 2020 issued in U.S. Appl. No. 16/374,082.
International Search Report of PCT/JP2017/002115 filed Mar. 28, 2017.
Decision to Grant a Patent dated Aug. 25, 2021.
US Office Action for U.S. Appl. No. 16/073,457 mailed on Oct. 14, 2021.
US Office Action and PTO-892 for U.S. Appl. No. 16/073,457 mailed on Feb. 14, 2022.
US Office Action for U.S. Appl. No. 16/073,457, mailed on Jul. 1, 2022.
Japanese Office Action for JP Application No. 2021-160688 mailed on Dec. 13, 2022 with English Translation.
Communication dated Jun. 6, 2023 issued by the Japanese Patent Office for Japanese Patent Application No. 2021-160688.
US Office Action for U.S. Appl. No. 17/471,900, mailed on Dec. 5, 2023.
US Office Action for U.S. Appl. No. 17/471,900, mailed on Apr. 24, 2024.
US Office Action for U.S. Appl. No. 18/383,183, mailed on Jul. 1, 2024.

(56) References Cited

OTHER PUBLICATIONS

US Notice of Allowance for U.S. Appl. No. 18/383,148, mailed on May 30, 2024.

* cited by examiner

FIG. 4

| POSITION INFORMATION (AREA INFORMATION) | TIME SLOT INFORMATION | ... |
|---|---|---|
| $\{(x_{a1}, y_{a1}), ...\}$ | XX:XX – YY:YY | |
| $\{(x_{b1}, y_{b1}), ...\}$ | xx:xx – yy:yy | |
| ⋮ | ⋮ | |

FIG. 5

| APPARATUS ID | POSITION INFORMATION | ADDRESS INFORMATION | ... |
|---|---|---|---|
| C001 | $(x_{C1}, y_{C1})$ | xxx.xxx.xxx.xxx | |
| C002 | $(x_{C2}, y_{C2})$ | yyy.yyy.yyy.yyy | |
| ⋮ | ⋮ | ⋮ | |

FIG. 6

| VIDEO ID | APPARATUS ID | POSITION INFORMATION | IMAGING TIME INFORMATION | ... |
|---|---|---|---|---|
| I001 | C001 | $(x_{C1}, y_{C1})$ | START: YYYY.MM.DD aa:aa<br>END : YYYY.MM.DD bb:bb | |
| I002 | C002 | $(x_{C2}, y_{C2})$ | START: YYYY.MM.DD cc:cc<br>END : YYYY.MM.DD dd:dd | |
| ⋮ | ⋮ | ⋮ | ⋮ | |

FIG. 9

| ACCIDENT OR CRIME | VICTIM TEMPLATE | ... |
|---|---|---|
| SNATCHING | • ELDERLY PERSON<br>  => PARTICULARLY WEEKDAY'S DAYTIME<br>• YOUNG WOMAN<br>  => PARTICULARLY WEEKDAY'S NIGHTTIME<br>• COMMON INFORMATION<br>  => HOLDING BAG IN HAND ON ROADWAY SIDE | |
| MINOR COLLISION | • CHILD<br>  => PARTICULARLY WEEKDAY'S MORNING OR EVENING<br>• COMMON INFORMATION<br>  => PARTICULARLY NONE | |
| ⋮ | ⋮ | |

FIG. 12

| POSITION INFORMATION | ENVIRONMENTAL INFORMATION | ... |
|---|---|---|
| $(x_{C1}, y_{C1})$ | • NUMBER OF PARKED VEHICLES IS LARGE OVER FROM MORNING TO DAYTIME<br>• AMOUNT OF TRAFFIC OF PERSONS IS LARGE OVER FROM MORNING TO DAYTIME<br>⋮ | |
| $(x_{C2}, y_{C2})$ | • VEHICLE HARDLY PASSES BY IN NIGHTTIME<br>⋮ | |
| ⋮ | ⋮ | |

INFORMATION PROCESSING APPARATUS, INFORMATION PROCESSING METHOD, AND PROGRAM

CROSS REFERENCE TO RELATED APPLICATIONS

This is a Continuation of U.S. patent application Ser. No. 17/471,900 filed Sep. 10, 2021, which is a continuation of U.S. patent application Ser. No. 16/073,457 filed Jul. 27, 2018, which issued as U.S. Pat. No. 11,494,579, which is a National Stage Entry of international application PCT/JP2017/002115 filed Jan. 23, 2017, claiming priority based on Japanese Patent Application No 2016-015713 filed Jan. 29, 2016, the content of which is incorporated hereinto by reference.

TECHNICAL FIELD

The present invention relates to a technique for assisting drafting a plan of surveillance work.

BACKGROUND ART

The following Patent Document 1 discloses a technique for identifying an area in which a person to be chased is highly likely to be located. In addition, the following Patent Document 2 and the following Patent Document 3 disclose a technique for predicting a time and space with a high possibility of a crime or an accident occurring, on the basis of past crime data or past traffic/civil accident data, and assisting drafting a personnel deployment plan for the police on the basis of information of the predicted time and space.

In addition to this, an example of a security technique for a case where an event has occurred is disclosed in, for example, the following Patent Documents 4 to 6. Patent Document 4 discloses an alarm apparatus provided in an area under surveillance. The alarm apparatus includes a switch for outputting a signal for giving notice of the occurrence of an event. When the switch is pressed down by a victim, the alarm apparatus analyzes an image of an area under surveillance captured at a time at which the switch has been pressed down or earlier, and identifies the victim and a person to be watched. In addition, Patent Document 5 discloses a technique wherein when a threating event or a criminal is detected by a surveillance apparatus (such as a sensor) provided in a building which is a target for surveillance, a video of a camera that surveils the position of the detected threat or additional information (such as information indicating how a criminal has invaded, information for identifying a criminal, information of a victim, information indicating the motion of a criminal, or information indicating the movement direction of a criminal) determined from the video is transmitted to an apparatus held by a person in authority. In addition, Patent Document 6 discloses an apparatus that checks a suspect through video surveillance, and provides real-time electronic information relating to the expected position of the suspect in a building or the motion of the suspect in the building.

RELATED DOCUMENTS

Patent Documents

[Patent Document 1] Japanese Patent Application Publication No. 2014-215747
[Patent Document 2] U.S. Pat. No. 8,949,164
[Patent Document 3] U.S. Pat. No. 8,849,728
[Patent Document 4] Japanese Patent Application Publication No. 2003-109155
[Patent Document 5] EP Patent Application Publication No. 2779130
[Patent Document 6] U.S. Patent Application Publication No. 2015/0124087

SUMMARY OF THE INVENTION

Technical Problem

There are limitations on resources (human resources such as a police officer or a guard, and physical resources such as a drone or other mobile devices) involved in surveillance work. Thus, in the technique of Patent Document 1, mentioned above, in a case where an area in which a person to be chased is highly likely to be located is wide, it is difficult to chase the person throughout the entirety of the wide area. In addition, similarly in the techniques of Patent Document 2 and Patent Document 3, mentioned above, in a case where an area and time predicted are over a wide range, there is a possibility of finite resources not fully covering the area and time. Thus, there is a need for a technique capable of effectively deploying finite resources involved in surveillance work.

An object of the present invention is to provide a technique capable of effectively deploying finite resources involved in surveillance work.

Solution to Problem

According to the present invention, there is provided an information processing apparatus including: a time and space information acquisition unit that acquires high-risk time and space information indicating a spatial region with an increased possibility of an accident occurring or of a crime being committed and a corresponding time slot; a possible surveillance target acquisition unit that identifies a video to be analyzed from among a plurality of videos generated by capturing an image of each of a plurality of places, on the basis of the high-risk time and space information, and analyzes the identified video to acquire information of a possible surveillance target; and a target time and space identification unit that identifies, from among the spatial region and the time slot indicated by the high-risk time and space information, at least one of a spatial region where surveillance is to be conducted which is at least a portion of the spatial region or a time slot when surveillance is to be conducted, on the basis of the information of the possible surveillance target.

According to the present invention, there is provided an information processing method executed by a computer, the method including: acquiring high-risk time and space information indicating a spatial region with an increased possibility of an accident occurring or of a crime being committed and a corresponding time slot; identifying a video to be analyzed from among a plurality of videos generated by capturing an image of each of a plurality of places, on the basis of the high-risk time and space information, and analyzing the identified video to acquire information of a possible surveillance target; and identifying, from among the spatial region and the time slot indicated by the high-risk time and space information, at least one of a spatial region where surveillance is to be conducted which is at least a portion of the spatial region or a time slot when surveillance is to be conducted, on the basis of the information of the possible surveillance target.

According to the present invention, there is provided a program for causing a computer to function as: a time and space information acquisition unit that acquires high-risk time and space information indicating a spatial region with an increased possibility of an accident occurring or of a crime being committed and a corresponding time slot; a possible surveillance target acquisition unit that identifies a video to be analyzed from among a plurality of videos generated by capturing an image of each of a plurality of places, on the basis of the high-risk time and space information, and analyzes the identified video to acquire information of a possible surveillance target; and a target time and space identification unit that identifies, from among the spatial region and the time slot indicated by the high-risk time and space information, at least one of a spatial region where surveillance is to be conducted which is at least a portion of the spatial region or a time slot when surveillance is to be conducted, on the basis of the information of the possible surveillance target.

According to the present invention, there is provided an information processing apparatus including: a time and space information acquisition unit that acquires high-risk time and space information indicating a spatial region with an increased possibility of an accident occurring or of a crime being committed and a corresponding time slot; a possible victim information acquisition unit that identifies a video to be analyzed from among a plurality of videos generated by capturing an image of each of a plurality of places, on the basis of the high-risk time and space information, and analyzes the identified video to acquire information of a possible victim of an accident or a crime; and a target time and space identification unit that identifies, from among the spatial region and the time slot indicated by the high-risk time and space information, at least one of a spatial region where surveillance is to be conducted which is at least a portion of the spatial region or a time slot when surveillance is to be conducted, on the basis of the information of the possible victim.

There is provided an information processing method executed by a computer, the method including: acquiring high-risk time and space information indicating a spatial region with an increased possibility of an accident occurring or of a crime being committed and a corresponding time slot; identifying a video to be analyzed from among a plurality of videos generated by capturing an image of each of a plurality of places, on the basis of the high-risk time and space information, and analyzing the identified video to acquire information of a possible victim of an accident or a crime; and identifying, from among the spatial region and the time slot indicated by the high-risk time and space information, at least one of a spatial region where surveillance is to be conducted which is at least a portion of the spatial region or a time slot when surveillance is to be conducted, on the basis of the information of the possible victim.

According to the present invention, there is provided a program for causing a computer to function as: a time and space information acquisition unit that acquires high-risk time and space information indicating a spatial region with an increased possibility of an accident occurring or of a crime being committed and a corresponding time slot; a possible victim information acquisition unit that identifies a video to be analyzed from among a plurality of videos generated by capturing an image of each of a plurality of places, on the basis of the high-risk time and space information, and analyzes the identified video to acquire information of a possible victim of an accident or a crime; and a target time and space identification unit that identifies, from among the spatial region and the time slot indicated by the high-risk time and space information, at least one of a spatial region where surveillance is to be conducted which is at least a portion of the spatial region or a time slot when surveillance is to be conducted, on the basis of the information of the possible victim.

Advantageous Effects of Invention

According to the present invention, it is possible to effectively deploy finite resources involved in surveillance work.

BRIEF DESCRIPTION OF THE DRAWINGS

The above and other objects, features, and advantages will be made clearer from certain preferred example embodiments described below, and the following accompanying drawings.

FIG. 4 is a diagram illustrating an example of high-risk time and space information.

FIG. 5 is a diagram illustrating information of a storage unit that stores position information of each imaging apparatus.

FIG. 6 is a diagram illustrating an example of a storage unit that collects and manages a video generated in each imaging apparatus.

FIG. 9 is a diagram illustrating an example of information stored by a template information storage unit.

FIG. 12 is a diagram illustrating an example of information stored by an environmental information storage unit.

DESCRIPTION OF EMBODIMENTS

Figure 1:
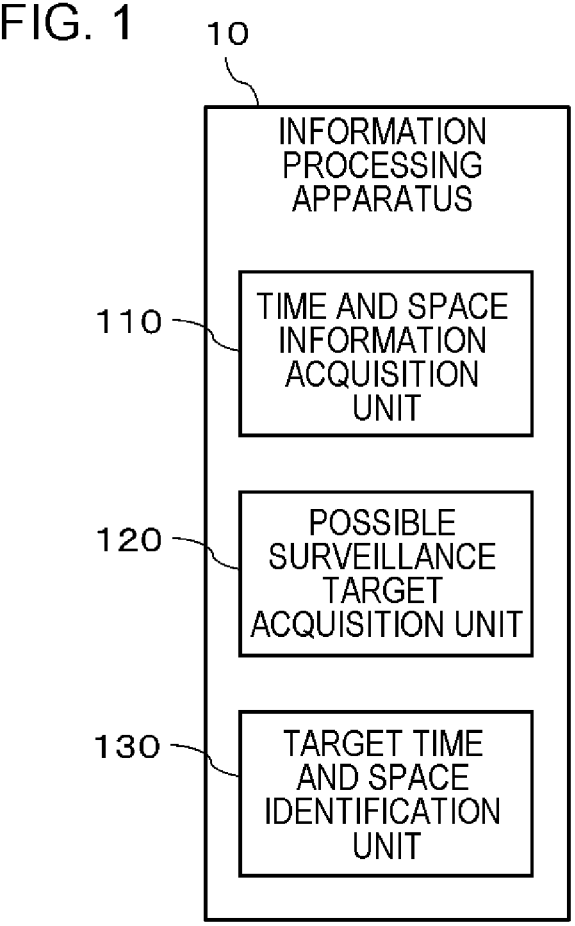
FIG. 1 is a diagram conceptually illustrating a functional configuration of an information processing apparatus of a first example embodiment.

Hereinafter, example embodiments of the present invention will be described with reference to the accompanying drawings. In all the drawings, like elements are referenced by like reference numerals and the descriptions thereof will not be repeated. In addition, in each block diagram except a hardware configuration diagram, each block represents a function-based block rather than a hardware-based configuration.

First Example Embodiment

An information processing apparatus according to the present invention provides a spatial region where intensive surveillance is to be conducted or a time when intensive surveillance is to be conducted, inclusive of a person such as, for example, a police officer or a guard, who is engaged in surveillance work against a crime, an accident or the like, a device which is operated by the person who is engaged in surveillance work, or the like.

[Functional Configuration]

FIG. 1 is a diagram conceptually illustrating a functional configuration of an information processing apparatus 10 of a first example embodiment. As shown in FIG. 1, the information processing apparatus 10 of the present example embodiment includes a time and space information acquisition unit 110, a possible surveillance target acquisition unit 120, and a target time and space identification unit 130. The time and space information acquisition unit 110 acquires high-risk time and space information indicating a spatial region with an increased possibility of an accident occurring or of a crime being committed and a corresponding time slot. The possible surveillance target acquisition unit 120 identifies a video to be analyzed from among a plurality of videos generated by capturing an image of each of a plurality of places, on the basis of the high-risk time and space information. The possible surveillance target acquisition unit 120 analyzes the identified video, and acquires information of a possible surveillance target. The target time and space identification unit 130 identifies, from among the spatial region and the time slot indicated by the high-risk time and space information, at least one of a spatial region where surveillance is to be conducted and which is at least a portion of the spatial region or a time slot when surveillance is to be conducted.

Advantageous Effect

According to the present example embodiment, high-risk time and space information, that is, a video (still image or moving image) pertaining to a spatial region with a high possibility of a crime being committed or of an accident occurring (hereinafter, also denoted by "high risk") and a corresponding time slot is analyzed, and information of a possible surveillance target (though described later in detail, a person or an object) is acquired. Using the information of the possible surveillance target, from among the spatial region and the time slot indicated by the high-risk time and space information, a spatial region where intensive surveillance is to be conducted or a time slot when intensive surveillance is to be conducted is identified. "The spatial region where intensive surveillance is to be conducted or the time slot when intensive surveillance is to be conducted" is provided to a display device or the like which is not shown. The information provided by the information processing apparatus 10 according to the present example embodiment serves as useful information for drafting a plan to effectively deploy finite resources involved in surveillance work (human resource such as a police officer or a guard and physical resource such as a drone or other mobile devices). For example, a person in charge of surveillance work or the like can easily set up a strategy such as the concentration of resources with a focus on a spatial region where intensive surveillance is to be conducted, or the concentration of resources centering around a time when intensive surveillance is to be conducted.

In addition, in the present example embodiment, the high-risk time and space information is used, so that a video to be analyzed is narrowed down from among a large number of videos. Thereby, an effect of reducing a load applied to a machine when a process of examining effective deployment of finite resources is performed can also be expected as compared with a case where all the videos are set to be analyzed.

Hereinafter, the information processing apparatus 10 of the present example embodiment will be further described in detail.

[Hardware Configuration]

Each functional configuration unit of the information processing apparatus 10 may be realized by hardware (such as, for example, a hard-wired electronic circuit) for realizing each functional configuration unit, and may be realized by a combination of hardware and software (such as, for example, combination of an electronic circuit and a program for controlling the electronic circuit). Hereinafter, a further description will be given of a case where each functional configuration unit of the information processing apparatus 10 is realized by a combination of hardware and software.

Figure 2:
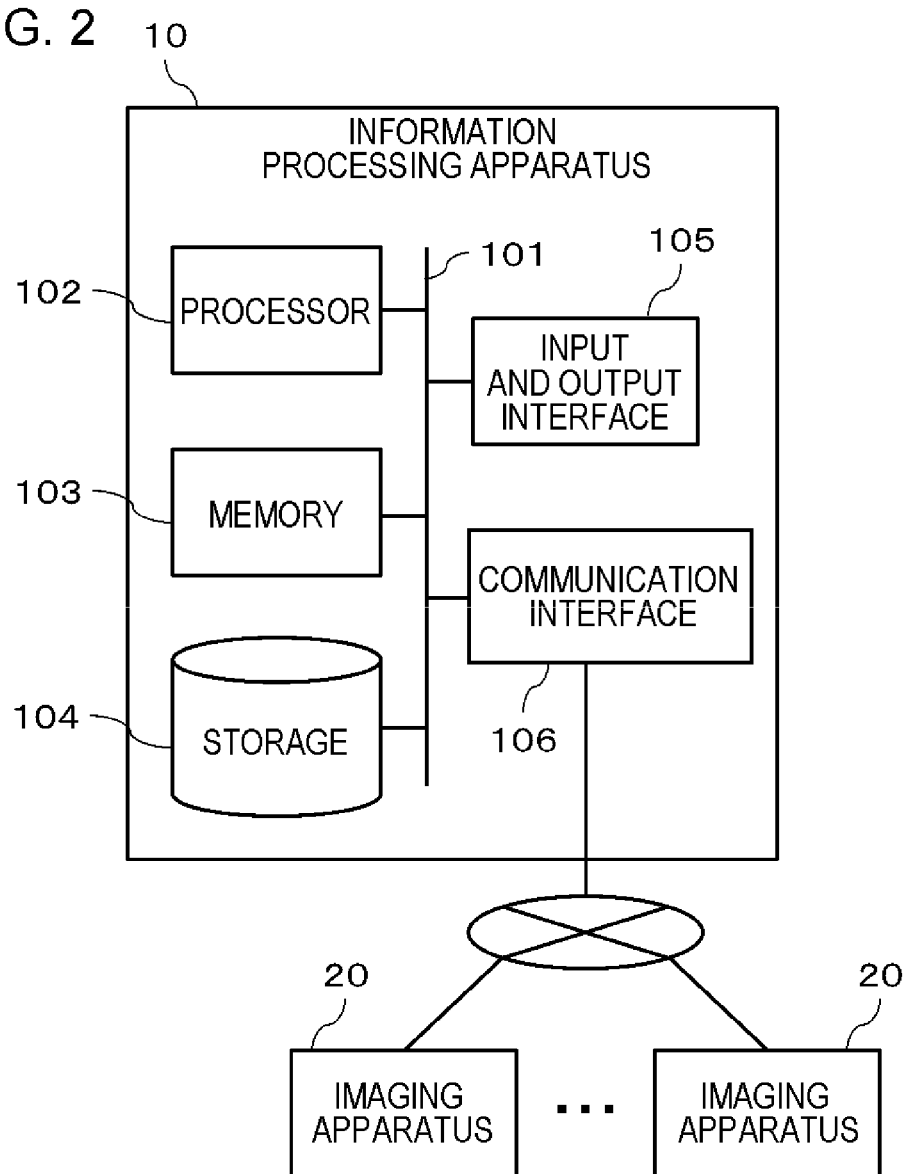
FIG. 2 is a diagram illustrating a hardware configuration of the information processing apparatus.

FIG. 2 is a diagram illustrating a hardware configuration of the information processing apparatus 10. The information processing apparatus 10 includes a bus 101, a processor 102, a memory 103, a storage 104, an input and output interface 105, and a communication interface 106. The bus 101 is a data transmission channel for transmitting and receiving data. The processor 102, the memory 103, the storage 104, the input and output interface 105, and the communication interface 106 mutually transmit and receive data through the bus 101. However, a method of connecting the processor 102 and the like to each other is not limited to a bus connection. The processor 102 is an arithmetic processing apparatus such as a central processing unit (CPU) or a graphics processing unit (GPU). The memory 103 is a memory such as a random access memory (RAM) or a read only memory (ROM). The storage 104 is a storage device such as a hard disk drive (HDD), a solid state drive (SSD), or a memory card. In addition, the storage 104 may be a memory such as a RAM or a ROM.

The input and output interface 105 is an interface for connecting the information processing apparatus 10 to an input and output device. For example, an input device such as a mouse or a keyboard, a display device such as a cathode ray tube (CRT) display or a liquid crystal display (LCD), a touch panel having the input device and the display device formed integrally with each other, or the like is connected to the input and output interface 105.

The communication interface 106 is an interface for connecting the information processing apparatus 10 to a network such as the Internet and making it possible to communicate with an external apparatus through the network. For example, the information processing apparatus 10 is connected to an imaging apparatus 20 through a network. However, the information processing apparatus 10 may not be connected to the imaging apparatus 20.

Here, the imaging apparatus 20 may be, for example, a camera such as a surveillance camera which is fixed to a predetermined position, and may be a mobile camera such as an in-vehicle camera or a wearable camera which is worn by a guard or a police officer. The mobile camera has a function of acquiring its own position information (for example, function of acquiring global positioning system (GPS) information or information of a linked base station in wireless communication). When a video is generated, the mobile camera acquires position information at the point in time, and associates the position information with the generated video. Thereby, the possible surveillance target acquisition unit 120 can determine whether a video captured by a mobile imaging apparatus is a video to be analyzed. For example, the possible surveillance target acquisition unit 120 can determine whether a video generated by a mobile imaging apparatus is a video to be analyzed, depending on whether position information associated with the video is included in the spatial region of the high-risk time and space information.

The storage 104 stores respective program modules for realizing functions of the processing units of the information processing apparatus 10 mentioned above. The processor 102 executes these respective program modules mentioned above, to thereby realize functions of the respective processing units corresponding to the program modules. Here, when the processor 102 executes the respective program modules, these program modules may be loaded into the memory 103 and then be executed, and may be executed without being loaded into the memory 103.

Note that the hardware configuration of the information processing apparatus 10 is not limited to the configuration shown in FIG. 2. For example, each program module may be stored in the memory 103. In this case, the information processing apparatus 10 may not include the storage 104. In addition, for example, at least some of a plurality of imaging apparatuses 20 in FIG. 2 may function as the information processing apparatus 10. In this case, the imaging apparatus 20 is an intelligent camera (which is also called, for example, an IP camera, a network camera, a smart camera, or the like having an analysis function therein) or the like, and is configured to include a memory or a storage device that stores respective program modules of the functions (time and space information acquisition unit 110, possible surveillance target acquisition unit 120, and target time and space identification unit 130) of the information processing apparatus 10 mentioned above, a processor that executes the program modules, and a communication interface for communicating with an external apparatus (for example, another imaging apparatus 20).

Operation Example

Figure 3:
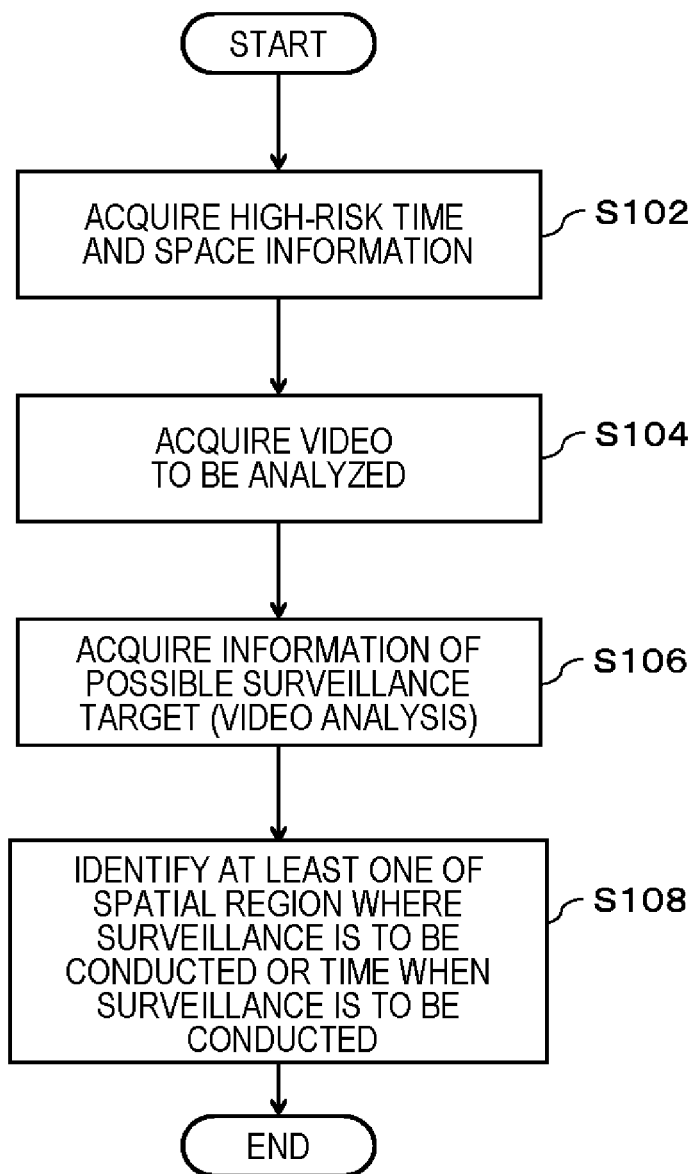
FIG. 3 is a flow diagram illustrating a flow of processes of the information processing apparatus of the first example embodiment.

Reference will be made to FIG. 3 to describe a flow of processes which are executed in the information processing apparatus 10 of the present example embodiment. FIG. 3 is a flow diagram illustrating a flow of processes of the information processing apparatus 10 of the first example embodiment.

First, the time and space information acquisition unit 110 acquires high-risk time and space information (S102). The time and space information acquisition unit 110 is stored in the storage 104 as a program module for realizing a function of, for example, Patent Document 2 or Patent Document 3, and predicts and acquires a high-risk time and space by the processor 102 executing the program. In addition, without being limited thereto, the time and space information acquisition unit 110 may communicate with an external apparatus that executes a program for realizing the function of, for example, Patent Document 2 or Patent Document 3 and generates high-risk time and space information, and acquire the high-risk time and space information from the external apparatus. In addition, a method of generating the high-risk time and space information is not limited to a method disclosed in Patent Document 2 or Patent Document 3. Here, FIG. 4 shows an example of the high-risk time and space information. However, FIG. 4 is merely an example, and the high-risk time and space information is not limited thereto. The high-risk time and space information illustrated in FIG. 4 includes information (area information) of a position with an increased possibility of a crime being committed and an accident occurring, and time slot information indicating a corresponding time slot. Note that, though not shown in FIG. 4, the time slot information may further include information of the date. Here, for example, GPS information, address information or the like is set in the position information (area information). Without being limited to the example exemplified herein, the position information may be information indicating an area of a certain shape which is specified by coordinate information (such as, for example, latitude and longitude) of three or more points. The high-risk time and space information may further include other information such as the type of risk (such as a crime, a traffic accident, or traffic rules violation) that is likely to occur or its probability of occurrence. In this case, the time and space information acquisition unit 110 may be configured to be capable of acquiring high-risk time and space information according to, for example, the type of risk (according to, for example, the type of crime, the type of traffic accident, or the type of traffic rules violation).

Next, the possible surveillance target acquisition unit 120 identifies and acquires a video to be analyzed, on the basis of the high-risk time and space information acquired in S102 (S104).

For example, the possible surveillance target acquisition unit 120 refers to a storage unit (for example, FIG. 5) that stores information indicating a position at which each imaging apparatus is located, and identifies an imaging apparatus included in a spatial region indicated by the high-risk time and space information, or an imaging apparatus in which at least a portion of a surveillance target area (imaging area) of the imaging apparatus is included in the spatial region indicated by the high-risk time and space information. FIG. 5 is a diagram illustrating information of a storage unit that stores position information of each imaging apparatus. The storage unit illustrated in FIG. 5 stores identification information (apparatus ID) of each imaging apparatus and position information of each imaging apparatus in association with each other. In addition, as illustrated in FIG. 5, this storage unit may further store address information (such as, for example, internet protocol (IP) address) in order for the possible surveillance target acquisition unit 120 to communicate with each imaging apparatus. In addition, for example, this storage unit may further store information of the surveillance target area of each imaging apparatus. In this case, the possible surveillance target acquisition unit 120 can determine whether at least a portion of the surveillance target area of an imaging apparatus is included in the spatial region indicated by the high-risk time and space information, using the information of the surveillance target area of each imaging apparatus of the above storage unit. The information of the surveillance target area can be described by coordinate information or the like of its vertex position by representing, for example, its region using a polygon. However, FIG. 5 is merely an example, and the form of a storage unit that stores the position information of each imaging apparatus is not limited thereto. This storage unit may be included in the information processing apparatus 10, and may be included in another apparatus which is communicably connected to the information processing apparatus 10. The possible surveillance target acquisition unit 120 compares, for example, the position information included in the high-risk time and space information of FIG. 4 with the position information of the imaging apparatus of FIG. 5, and identifies an imaging apparatus corresponding to a spatial region indicated by the high-risk time and space information or a place located near the spatial region. The possible surveillance target acquisition unit 120 then identifies a video of the identified imaging apparatus as a video to be analyzed. The possible surveillance target acquisition unit 120 then communicates with the imaging apparatus using address information of the identified imaging apparatus, and acquires the video to be analyzed.

It should be noted that, in a case where an imaging apparatus is a mobile imaging apparatus of which the position moves like, for example, an in-vehicle camera, a drone, or a wearable camera, the position of the imaging apparatus is measured by GPS or the like, and is stored in a storage unit. Further, in a case where information indicating the height or direction of a mobile imaging apparatus can be acquired, it is possible to obtain information of an area on which the imaging apparatus conducts surveillance. In this case, the storage unit can further store the information of the surveillance target area which is obtained using information such as the height or direction of such a mobile imaging apparatus.

Here, the possible surveillance target acquisition unit 120 acquires a video at the current point in time, a video in the past (such as, for example, a video at the same time slot of the previous day or a week ago), a video from a predetermined time ago (for example, an hour ago) to the current point in time, a video from a point in time specified through an input device to the current point in time, or the like, as a video to be analyzed. In addition, the possible surveillance target acquisition unit 120 may acquire a video to be analyzed, on the basis of specified time information. Though not particularly limited, the time information is information indicating a weekday, Saturday, Sunday and national holiday, a specific time slot, a combination of a day of the week and a time slot (for example, time slot at which a child leaves school on weekdays), a period of closure of a school (for example, summer vacation or winter vacation), a general payday, a pension payday, or the like. In addition, the possible surveillance target acquisition unit 120 may identify and acquire a video to be analyzed, on the basis of conditions (such as, for example, season, weather, or air temperature) except the above times, or in further addition to the conditions except the times. The conditions for identifying a video which is acquired as a video to be analyzed by the possible surveillance target acquisition unit 120 may be set in advance, and may be specified through an input device or the like of the information processing apparatus 10.

In addition, in a case where a storage unit (for example, FIG. 6) that collects and manages a video generated in an imaging apparatus is present, the possible surveillance target acquisition unit 120 may identify a video to be analyzed by referring to the storage unit. FIG. 6 is a diagram illustrating an example of a storage unit that collects and manages a video generated in each imaging apparatus. In the example of FIG. 6, identification information (video ID) of each video, identification information (apparatus ID) of an imaging apparatus having generated the video, its position information, and imaging time information including an imaging start time and an imaging end time are stored. However, FIG. 6 is merely an example, and the form of a storage unit that collects and manages a video generated in each imaging apparatus is not limited thereto. This storage unit may be included in the information processing apparatus 10, and may be included in another apparatus which is communicably connected to the information processing apparatus 10. The possible surveillance target acquisition unit 120 can identify and acquire a video to be analyzed from the storage unit illustrated in FIG. 6, using, as a key, the identification information of an imaging apparatus identified as described above using the position information included in the high-risk time and space information, or the position information and the time information included in the high-risk time and space information.

The possible surveillance target acquisition unit 120 analyzes the acquired video, and acquires information of a possible surveillance target (S106). Here, the "possible surveillance target" includes a person who has caused a crime or an accident before, a vehicle possessed by the person, and a person and a vehicle with the possibility of causing a crime or an accident. Though not particularly limited, the possible surveillance target acquisition unit 120 identifies a possible surveillance target as in a specific example described later, and generates information of the possible surveillance target. Note that the information of a possible surveillance target may be, for example, simply the number of possible surveillance targets, and may include information pertaining to a person or an object identified as a possible surveillance target.

First Specific Example

In the present example, the time and space information acquisition unit 110 acquires, at least, high-risk time and space information relating to a crime. A video to be analyzed is identified on the basis of the high-risk time and space information acquired herein. Note that the time and space information acquisition unit 110 may acquire high-risk time and space information relating to a specific type of crime, and identify a video to be analyzed in accordance with the type. The possible surveillance target acquisition unit 120 recognizes a person within a range (imaging range of an imaging apparatus) of the video identified as a video to be analyzed, using, for example, a face or person recognition technique or the like. Thereby, the possible surveillance target acquisition unit 120 recognizes a person coming into the range of the video to be analyzed, a person going out of the range, a person staying in the range, or the like. The possible surveillance target acquisition unit 120 then collates the recognized person with an existing person under surveillance. The person under surveillance is not particularly limited, and is, for example, a person with a criminal record, a wanted person, a person exemplified as a surveillance target for some kind of reason, or the like. Here, in a case where the time and space information acquisition unit 110 acquires the high-risk time and space information relating to a specific type of crime, the possible surveillance target acquisition unit 120 can use the type to narrow down information of an existing person under surveillance for use in collation. The information of an existing person under surveillance is registered with a predetermined storage unit (not shown), and this storage unit is included in, for example, the system of the police agency. The possible surveillance target acquisition unit 120 then identifies a corresponding person as a possible surveillance target in the storage unit.

Second Specific Example

In the present example, the time and space information acquisition unit 110 acquires, at least, high-risk time and space information relating to a crime. A video to be analyzed is identified on the basis of the high-risk time and space information acquired herein. Note that the time and space information acquisition unit 110 may acquire high-risk time and space information relating to a specific type of crime, and identify a video to be analyzed in accordance with the type. In a case where as a result of analyzing the video identified as a video to be analyzed, a person estimated to be identical is detected in a place of a predetermined range a predetermined number of times or more or for a predetermined length of time or more, the possible surveillance target acquisition unit 120 identifies a feature of the person obtained by analyzing the video as a possible surveillance target. The possible surveillance target acquisition unit 120 may use, for example, an image recognition technique or the like for tracking a person estimated to be identical, to thereby acquire information such as the number of times when a person estimated to be identical is detected in a video to be analyzed or the length of time for which the person is detected. It can be said that a person who has been detected many times is a person who appears frequently in the predetermined range. In addition, it can be said that a person who has been detected for a long length of time is a person who roams around the predetermined range for a long time. Such a person may be considered to be a suspicious person who is likely to be performing a preliminary inspection of a crime. Consequently, the possible surveillance target acquisition unit 120 identifies such a person as the possible surveillance target, on the basis of the analysis result of a video. Here, in a case where the time and space information acquisition unit 110 acquires the high-risk time and space information relating to a specific type of crime, the possible surveillance target acquisition unit 120 can use a feature previously defined in association with the type of crime, to thereby identify a possible surveillance target accurately. Note that, by providing a threshold or the like for determining that a person has been detected many times or the person has been detected for a long length of time, the possible surveillance target acquisition unit 120 can determine the presence or absence of the person as described above on the basis of the threshold, from a video to be analyzed. Information such as this threshold may be stored in advance in, for example, the storage 104 or the like of FIG. 2, and may be acquired through the input and output interface 105 or the communication interface 106 of FIG. 2.

Third Specific Example

In the present example, the time and space information acquisition unit 110 acquires, at least, high-risk time and space information relating to a crime. A video to be analyzed is identified on the basis of the high-risk time and space information acquired herein. Note that the time and space information acquisition unit 110 may acquire high-risk time and space information relating to a specific type of crime, and identify a video to be analyzed in accordance with the type. In a case where as a result of analyzing the identified video as a video to be analyzed, a two-wheeled or three-wheeled vehicle with two people thereon which is estimated to be identical is detected in a place of a predetermined range a predetermined number of times or more or for a predetermined length of time or more, the possible surveillance target acquisition unit 120 identifies the two-wheeled or three-wheeled vehicle as the possible surveillance target. The possible surveillance target acquisition unit 120 can use, for example, an image recognition technique or the like for tracking an object estimated to be identical, to thereby acquire information such as the number of times when a vehicle estimated to be identical is detected in a video to be analyzed or the length of time for which the vehicle is detected. It can be said that a vehicle that has been detected many times is a vehicle that appears frequently in the predetermined range. In addition, it can be said that a vehicle that has been detected for a long length of time is a vehicle that roams around the predetermined range for a long time. In a case where such a vehicle is a two-wheeled or three-wheeled vehicle and has two people thereon, the vehicle may be considered to be a suspicious vehicle which can be used in a crime such as snatching. Consequently, the possible surveillance target acquisition unit 120 identifies such a vehicle as the possible surveillance target, on the basis of the analysis result of a video. Here, in a case where the time and space information acquisition unit 110 acquires the high-risk time and space information relating to a specific type of crime, the possible surveillance target acquisition unit 120 can use a feature previously defined in association with the type of crime, to thereby identify a possible surveillance target accurately. Note that, by providing a threshold or the like for determining that a vehicle has been detected many times or the vehicle has been detected for a long length of time, the possible surveillance target acquisition unit 120 can determine the presence or absence of the vehicle as described above on the basis of the threshold, from a video to be analyzed. Information such as this threshold may be stored in advance in, for example, the storage 104 or the like of FIG. 2, and may be acquired through the input and output interface 105 or the communication interface 106 of FIG. 2.

Fourth Specific Example

In the present example, the time and space information acquisition unit 110 acquires, at least, high-risk time and space information relating to a crime. A video to be analyzed is identified on the basis of the high-risk time and space information acquired herein. Note that the time and space information acquisition unit 110 may acquire high-risk time and space information relating to a specific type of crime, and identify a video to be analyzed in accordance with the type. The possible surveillance target acquisition unit 120 recognizes a vehicle within a range (imaging range of an imaging apparatus) of the video identified as a video to be analyzed. The possible surveillance target acquisition unit 120 uses various image recognition techniques, to thereby recognize each vehicle within the range of the video to be analyzed (a vehicle coming into the range of the video to be analyzed, a vehicle going out of the range, a vehicle staying in the range, or the like). The possible surveillance target acquisition unit 120 then identifies a possessor of the recognized vehicle by referring to a storage unit (not shown) that registers information including a possessor of each vehicle. This storage unit is included in, for example, the system of a local autonomous body. The possible surveillance target acquisition unit 120 collates the identified possessor with an existing person under surveillance. The person under surveillance is not particularly limited, and is, for example, a person with a criminal record, a wanted person, a person exemplified as a surveillance target for some kind of reason, or the like. Here, in a case where the time and space information acquisition unit 110 acquires the high-risk time and space information relating to a specific type of crime, the possible surveillance target acquisition unit 120 may use the type to narrow down data used in collation. The information of an existing person under surveillance is registered with a predetermined storage unit (not shown), and this storage unit is included in, for example, the system of the police agency. The possible surveillance target acquisition unit 120 then identifies a corresponding person as a possible surveillance target in the storage unit.

Fifth Specific Example

In the present example, the time and space information acquisition unit 110 acquires, at least, high-risk time and space information relating to a traffic accident or traffic rules violation. Note that the time and space information acquisition unit 110 may acquire high-risk time and space information relating to a specific type of traffic accident or traffic rules violation, and identify a video to be analyzed in accordance with the type. The possible surveillance target acquisition unit 120 then recognizes a vehicle within a range (imaging range of an imaging apparatus) of the video identified as a video to be analyzed. The possible surveillance target acquisition unit 120 uses various image recognition techniques, to thereby recognize each vehicle within the range of the video to be analyzed (a vehicle coming into the range of the video to be analyzed, a vehicle going out of the range, a vehicle staying in the range, or the like). The possible surveillance target acquisition unit 120 then collates whether the recognized vehicle is a vehicle which is possessed by a person who has caused a traffic accident or a person who has violated traffic rules before. Here, in a case where the time and space information acquisition unit 110 acquires the high-risk time and space information relating to a specific type of traffic accident or traffic rules violation, the possible surveillance target acquisition unit 120 can use the type to narrow down data used in collation. Information of a vehicle which is possessed by a person who has caused a traffic accident or a person who has violated traffic rules before is registered with a predetermined storage unit (not shown), and this storage unit is included in, for example, the system of a local autonomous body. The possible surveillance target acquisition unit 120 then identifies a corresponding vehicle as the possible surveillance target in the storage unit.

Other Specific Examples

In addition, the possible surveillance target acquisition unit 120 may accept an input of information relating to a crime currently under investigation instead of acquiring a video, and acquire information of a possible surveillance target on the basis of the information. For example, in a case where the modus operandi of a crime currently under investigation is acquired as input information, the possible surveillance target acquisition unit 120 may obtain a profiling result by referring to a database that stores information of existing criminals or wanted persons. Specifically, the possible surveillance target acquisition unit 120 may acquire information such as a person who committed a crime using the same modus operandi and the residence place or action time of the person as the information of a possible surveillance target.

Next, the target time and space identification unit 130 identifies at least one of a spatial region where surveillance is to be conducted or a time when surveillance is to be conducted, from among the high-risk spatial region and time slot indicated by the high-risk time and space information, on the basis of the information of a possible surveillance target acquired in S106 (S108).

As an example, in the possible surveillance target acquisition unit 120, it is assumed that a video at the current time or a video in the latest time range is identified as a video to be analyzed, and that the information of a possible surveillance target is acquired from the video. In this case, the target time and space identification unit 130 counts the number of pieces of information of possible surveillance targets acquired, for each spatial region indicated by the high-risk time and space information. The target time and space identification unit 130 then identifies the degrees of priority of high-risk spatial regions at the same time slot in accordance with the counted number. Here, it can be said that the higher the degree of priority of a spatial region given is, the higher the degree of surveillance in the spatial region is. The target time and space identification unit 130 identifies spatial regions where surveillance is to be conducted in descending order of priority, in a range in which operable resources can handle. Information of operable resources is not particularly limited, and is stored in, for example, a predetermined storage region of the information processing apparatus 10. In addition, the target time and space identification unit 130 may regulate a time for which surveillance work is performed in a high-risk spatial region, in accordance with the counted number. The target time and space identification unit 130 allocates a longer time for which surveillance work is performed, to a spatial region having, for example, having a larger number of possible surveillance targets, that is, having a higher potential risk.

In addition, as another example, it is assumed that the possible surveillance target acquisition unit 120 identifies the past video (for example, video in the same spatial region and at the same time slot of the previous day or a week ago) in the spatial region and time slot indicated by the high-risk time and space information as a video to be analyzed, and that information of a possible surveillance target is acquired from the video. In this case, the target time and space identification unit 130 counts the number of pieces of information of possible surveillance targets acquired, for example, according to the spatial region and time slot indicated by the high-risk time and space information. The counted number obtained herein serves as information indicating the risk tendency of the time and space indicated by the high-risk time and space information. The target time and space identification unit 130 regulates the degrees of priority of high-risk spatial regions at the same time slot, or a time for which surveillance work is performed in the high-risk spatial regions, in accordance with the counted number.

As still another example, the possible surveillance target acquisition unit 120 may count the number of pieces of information of possible surveillance targets for each spatial region and time slot, and the target time and space identification unit 130 may regulate the degrees of priority of high-risk spatial regions at the same time slot, or a time for which surveillance work is performed in the high-risk spatial regions, in accordance with the counted number for each spatial region and time slot.

In this manner, in the present example embodiment, the target time and space identification unit 130 can use the information of a possible surveillance target to thereby adjust a spatial region where surveillance is to be conducted, a time slot when surveillance is to be conducted, and both of them. A person in charge of surveillance work can easily set up a strategy relating to surveillance work, on the basis of the adjusted information.

Second Example Embodiment

The present example embodiment has the same functional configuration and hardware configuration as those in the first example embodiment, except for the following points.

[Functional Configuration and Hardware Configuration]

Figure 7:
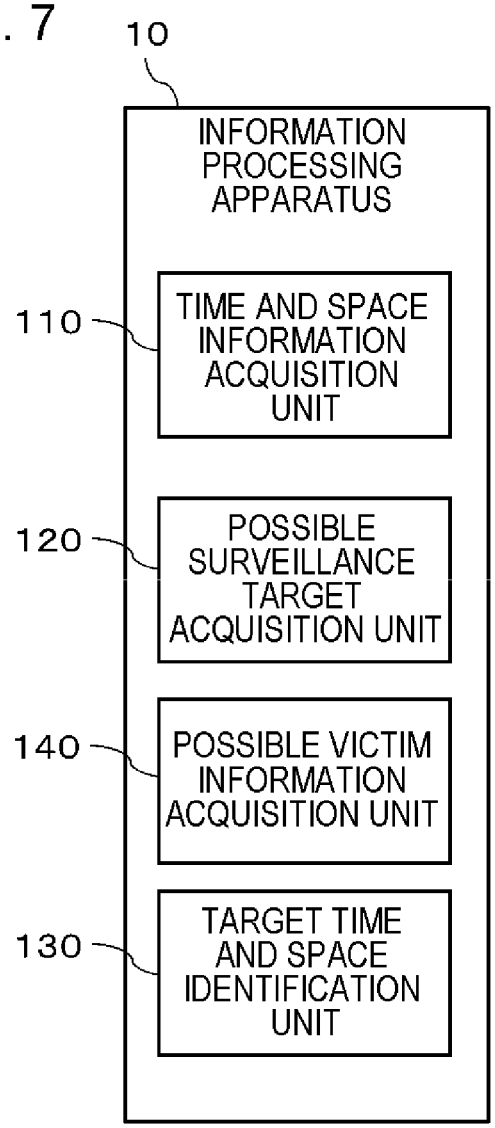
FIG. 7 is a diagram conceptually illustrating a functional configuration of an information processing apparatus of a second example embodiment.

FIG. 7 is a diagram conceptually illustrating a functional configuration of an information processing apparatus 10 of a second example embodiment. As shown in FIG. 7, the information processing apparatus 10 of the present example embodiment further includes a possible victim information acquisition unit 140, in addition to the configuration of the first example embodiment. The information processing apparatus 10 of the present example embodiment further stores a program for realizing a function of the possible victim information acquisition unit 140, described later, in the storage 104 of FIG. 2. The processor 102 executes this program module, to thereby further realize the function of the possible victim information acquisition unit 140.

The possible victim information acquisition unit 140 acquires information of a possible victim of an accident or a crime. The possible victim information acquisition unit 140 may use, for example, template information of a typical victim of a crime or an accident to thereby identify a possible victim. This template information may be generated by, for example, statistics of victims of crimes or accidents that have occurred in the past. The possible victim information acquisition unit 140 refers to a template information storage unit (not shown) that stores the template information, to identify a person having a feature matching the template information, as a possible victim, from the video identified as a video to be analyzed. Note that the term "matching" as used herein refers to indicating more than a certain degree of similarity. The template information storage unit may be included in the information processing apparatus 10, and may be included in another apparatus which is communicably connected to the information processing apparatus 10.

In addition, though described later in detail, the possible victim information acquisition unit 140 may narrow down and select possible victims on the basis of the information of a possible-surveillance target acquired in the possible surveillance target acquisition unit 120.

The target time and space identification unit 130 of the present example embodiment uses the information of a possible victim acquired by the possible victim information acquisition unit 140, to adjust at least one of a spatial region where surveillance is to be conducted or a time slot when surveillance is to be conducted.

Operation Example

Figure 8:
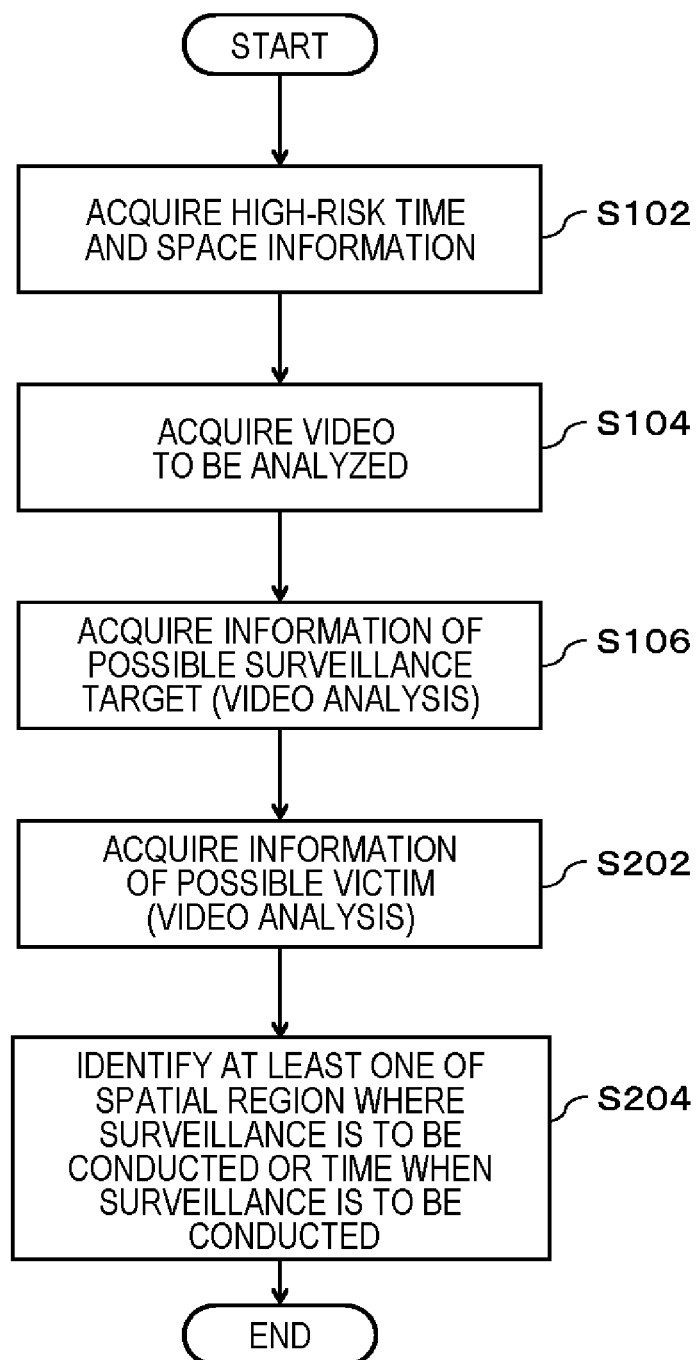
FIG. 8 is a flow diagram illustrating a flow of processes of the information processing apparatus of the second example embodiment.

Reference will be made to FIG. 8 to describe a flow of processes which are executed in the information processing apparatus 10 of the present example embodiment. FIG. 8 is a flow diagram illustrating a flow of processes of the information processing apparatus 10 of the second example embodiment. Hereinafter, processes different from those in the first example embodiment will be mainly described.

First, in a case where the information of a possible surveillance target is acquired in S106, the possible victim information acquisition unit 140 identifies a possible victim corresponding to the possible surveillance target, and acquires information of the possible victim (S202). For example, a person identified as a possible-surveillance target in the possible surveillance target acquisition unit 120 is assumed to a person who has committed snatching in the past. In addition, the template information storage unit is assumed to store, for example, information as shown in FIG. 9. FIG. 9 is a diagram illustrating an example of information stored by the template information storage unit. In the example of FIG. 9, regarding snatching, template information is stored which indicates that an elderly person has a tendency to suffer damage at a time slot in, particularly, the weekday's daytime, and that a young woman has a tendency to suffer damage in, particularly, the weekday's nighttime. Further, as common information of snatching, template information is stored which indicates that a person who holds a bag in hand on the roadway side has a tendency to suffer damage. In addition, regarding a minor collision, information is stored which indicates that a child has a tendency to suffer damage in, particularly, the weekday's morning or evening. In this case, the possible victim information acquisition unit 140 uses the template information relating to snatching of FIG. 9, to identify and acquire information of a possible victim of snatching from a video to be analyzed. This information of a possible victim may be a number simply determined to match the template information, and may include information (information such as age, sex, manner of walking, or how to hold an object) pertaining to a person identified as a possible victim.

Next, the target time and space identification unit 130 uses the information of a possible surveillance target acquired in S106 and the information of a possible victim acquired in S202, to identify at least any one of a spatial region where surveillance is to be conducted or a time slot when surveillance is to be conducted (S204). For example, the target time and space identification unit 130 adjusts the degree of priority of a spatial region where surveillance is to be conducted or the length of time when surveillance is to be conducted, in accordance with a correspondence relation between the number of possible surveillance targets and the number of possible victims.

Modification Example of Process

Note that, in the example of FIG. 8, the process of S106 and the process of S202 may be executed in parallel with each other. In addition, in the example of FIG. 8, the process of S202 may be executed alone without executing the process of S106. In this case, the information processing apparatus 10 may not include the possible surveillance target acquisition unit 120. The target time and space identification unit 130 identifies a spatial region or a time slot where the number of possible victims (the number of pieces of information of possible victims) obtained in S202 is large, in S204, as a spatial region where surveillance is to be conducted or a time slot when surveillance is to be conducted. Note that, by providing a threshold or the like for determining that the number of possible victims is large, the target time and space identification unit 130 can identify a spatial region where surveillance is to be conducted or a time slot when surveillance is to be conducted, on the basis of the threshold. Information such as this threshold may be stored in advance in, for example, the storage 104 or the like of FIG. 2, and may be acquired through the input and output interface 105 or the communication interface 106 of FIG. 2. In this manner, a person in charge can easily set up a strategy relating to surveillance work such as guarding or anti-crime activity, with a focus on the spatial region or the time slot identified on the basis of the number of persons who are likely to become victims.

Advantageous Effect

Hereinbefore, according to the present example embodiment, at least one of a spatial region where surveillance is to be conducted or a time slot when surveillance is to be conducted is adjusted using the information of a possible victim. Thereby, according to the present example embodiment, it is possible to more accurately identify a spatial region where intensive surveillance is to be conducted or a time slot when intensive surveillance is to be conducted. For example, in a case where no possible victim is present even when a possible surveillance target is identified, it can be determined that the possibility of an accident or a crime occurring is low. On the other hand, in a case where both a possible surveillance target and a possible victim are detected in places close to each other, it can be determined that the possibility of an accident or a crime occurring is high. In addition, in a case where both a possible surveillance target and a possible victim are detected at time slots close to each other, it can be determined that the possibility of an accident or a crime occurring is high. The information processing apparatus 10 of the present example embodiment can accurately specify a spatial region where surveillance is to be conducted and a time slot when surveillance is to be conducted, in accordance with risk which is determined by a combination of the information of a possible surveillance target and the information of a possible victim. Note that, as is the case with the first example embodiment, the information processing apparatus 10 of the present example embodiment can determine risk by identifying a real-time possible victim from a video at the current time or a video in the latest time range, and can also determine risk by identifying a trend in the behavior of a possible victim from the past video.

Third Example Embodiment

The present example embodiment has the same functional configuration and hardware configuration as those of the first example embodiment and the second example embodiment, except for the following points. Note that the following shows an example in which the configuration of the first example embodiment is used as a base.

[Functional Configuration]

Figure 10:
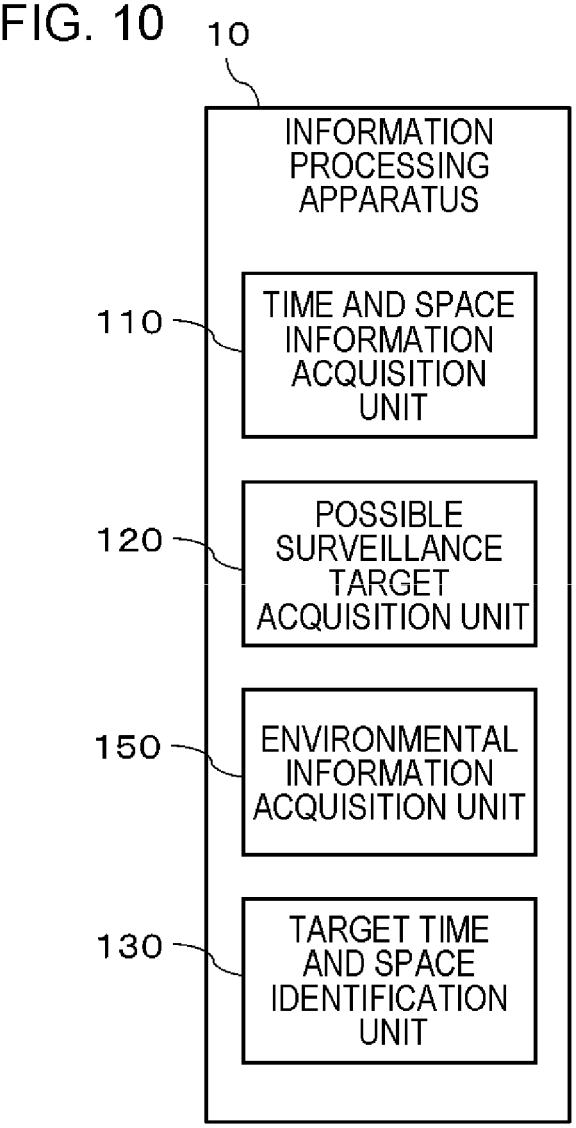
FIG. 10 is a diagram conceptually illustrating a functional configuration of an information processing apparatus of a third example embodiment.

FIG. 10 is a diagram conceptually illustrating a functional configuration of an information processing apparatus 10 of a third example embodiment. As shown in FIG. 10, the information processing apparatus 10 of the present example embodiment further includes an environmental information acquisition unit 150, in addition to the configuration of the first example embodiment. The information processing apparatus 10 of the present example embodiment further stores a program for realizing a function of the environmental information acquisition unit 150, described later, in the storage 104. The processor 102 executes this program module, to thereby further realize the function of the environmental information acquisition unit 150.

The environmental information acquisition unit 150 generates environmental information of a region included in a video identified as a video to be analyzed, on the basis of the identified video or information for identifying the place of the video. The "environmental information" as used herein refers to information relating to environmental factors which are likely to influence the probability of occurrence of an accident or a crime. Specific examples of the environmental information include, for example, information indicating the degree of congestion of persons or vehicles, information indicating the flow of persons or vehicles, information indicating the situation of vehicles stopping, information indicating the goodness or badness of road visibility, information indicating whether being a place of which the inside situation is hard to grasp due to its periphery being surrounded by a shield such as a tree, information indicating whether being a place provided with a lighting device (whether being a place which is sufficiently bright), and the like. However, the environmental information is not limited to the examples exemplified herein. For example, the environmental information can also be generated using information obtained by analyzing information integrated from an in-vehicle driving recorder or the like. Specifically, information of sudden braking of a vehicle is collected and counted, and thus information indicating whether sudden braking is applied very often in the place (that is, whether being a place where behavior possibly leading to an accident is likely to happen) can be generated as the environmental information.

The target time and space identification unit 130 of the present example embodiment uses the environmental information acquired by the environmental information acquisition unit 150, to adjust at least one of a spatial region where surveillance is to be conducted or a time slot when surveillance is to be conducted.

Operation Example

Figure 11:
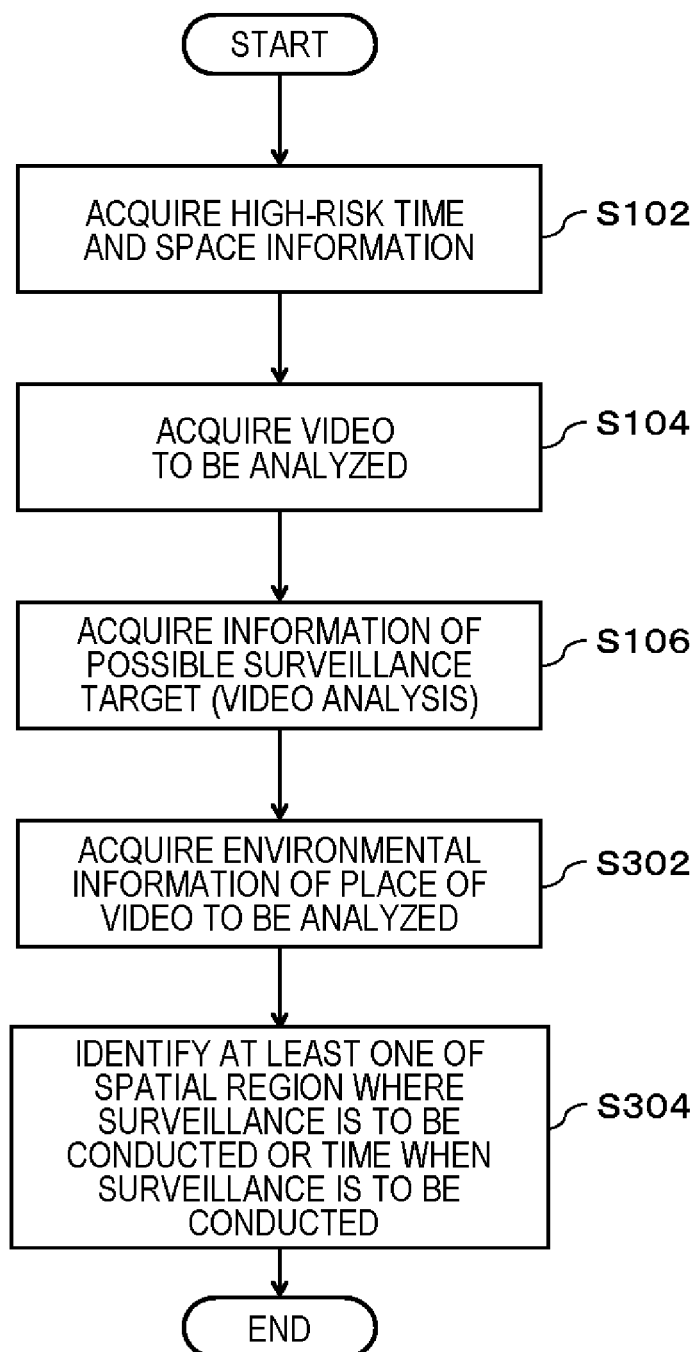
FIG. 11 is a flow diagram illustrating a flow of processes of the information processing apparatus of the third example embodiment.

Reference will be made to FIG. 11 to describe a flow of processes which are executed in the information processing apparatus 10 of the present example embodiment. FIG. 11 is a flow diagram illustrating a flow of processes of an information processing apparatus 10 of a third example embodiment. Hereinafter, processes different from those in the first example embodiment will be mainly described.

As shown in a specific example described later, the environmental information acquisition unit 150 acquires the environmental information on the basis of the video identified as a video to be analyzed (S302). However, processes executed by the environmental information acquisition unit 150 are not limited to a specific example described later.

As an example, the environmental information acquisition unit 150 analyzes a video, to thereby calculate the density per unit area (degree of congestion), the movement direction, the movement speed (flow of vehicles or pedestrians), or the like of pedestrians or vehicles, and acquire environmental information indicating a congestion situation in the vicinity of the range of the video (imaging range of an imaging apparatus). For example, it can be said that, in a place crowded with persons or vehicles, there is a higher risk of an accident such as a minor collision occurring than in an uncrowded place. In addition, it can be said that, in a place where the number of persons or vehicles is small, there is less public sight, and thus there is a high risk of a crime occurring. The environmental information acquisition unit 150 acquires information indicating such a congestion situation as the environmental information.

In addition, as another example, the environmental information acquisition unit 150 can also analyze a video to thereby detect the presence or absence of a blind spot that arouses a crime or an accident. For example, in a case where an object, such as a garden plant, a fence of a private house, or a parked vehicle, which causes a blind spot is present, the object causes a blind spot. In a case where such a blind spot is present, there is the possibility of a pedestrian coming out suddenly from the blind spot. That is, it can be said that, in a place where an object that causes a blind spot is present, there is a high risk of a minor collision with a vehicle or a person occurring as compared with a clear place with good visibility. In addition, it can also be said that, in a place where an object that causes a blind spot is present, it is out of eyeshot and thus there is a high risk of some kind of crime occurring as compared with a clear place with good visibility. Consequently, the environmental information acquisition unit 150 detects an object, such as a garden plant, a fence of a private house, or a parked vehicle, which causes a blind spot, from a video to be analyzed, and acquires the presence or absence of such an object, the number of objects, or the like as the environmental information.

In the above specific example, an example has been illustrated in which the environmental information acquisition unit 150 analyzes a video to acquire environmental information. However, without analyzing a video, the environmental information acquisition unit 150 acquires the environmental information on the basis of information for identifying a place of the video. For example, as shown in FIG. 12, in a case where an environmental information storage unit that stores position information and environmental information in association with each other is prepared in advance, the environmental information acquisition unit 150 can use a spatial region or a time slot indicated by the high-risk time and space information, to thereby acquire the environmental information from the environmental information storage unit. For example, an imaging apparatus of which the imaging apparatus ID in FIG. 5 is "C001" is assumed to be identified on the basis of the high-risk time and space information acquired in S102. In this case, the environmental information acquisition unit 150 can acquire environmental information corresponding to position information $(x_{C1}, y_{C1})$ of FIG. 12, on the basis of position information "$(x_{C1}, y_{C1})$" corresponding to the imaging apparatus. In this example, the position information "$(x_{C1}, y_{C1})$" corresponding to the imaging apparatus is "information for identifying a place of a video".

Next, the target time and space identification unit 130 uses the information of a possible surveillance target acquired in S106 and the environmental information acquired in S302, to thereby identify a spatial region where surveillance is to be conducted or a time slot when surveillance is to be conducted (S304). For example, the target time and space identification unit 130 uses a predetermined mathematical expression for adjusting the degree of priority of a spatial region where surveillance is to be conducted or a time slot when surveillance is to be conducted (length of time), using the number of blind spots, the degree of congestion, or the like indicated by the environmental information acquired in S302 as parameters, to thereby adjust the spatial region where surveillance is to be conducted or the time when surveillance is to be conducted which is identified on the basis of the information of a possible surveillance target acquired in S106. However, processes executed in the target time and space identification unit 130 of the present example embodiment are not restricted to this example.

Modification Example of Process

It should be noted that, in the example of FIG. 11, the process of S106 and the process of S302 may be executed in parallel with each other. In addition, in the example of FIG. 11, the process of S302 may be executed alone without executing the process of S106. In this case, the information processing apparatus 10 may not include the possible surveillance target acquisition unit 120. The target time and space identification unit 130 uses, for example, a predetermined mathematical expression for calculating the degree of priority of a spatial region where surveillance is to be conducted or a time slot when surveillance is to be conducted (length of time), using the number of blind spots, the degree of congestion, or the like indicated by the environmental information acquired in S302 as parameters, to thereby identify a spatial region where surveillance is to be conducted or a time slot when surveillance is to be conducted. In this manner, even in a case where possible victims are not extracted, it is possible to identify a spatial region where surveillance is to be conducted or a time slot when surveillance is to be conducted, in accordance with environmental information extracted from a video to be analyzed or environmental information which is set in advance. A person in charge can easily set up a strategy relating to surveillance work such as guarding or anti-crime activity, on the basis of the information identified herein.

Advantageous Effect

Hereinbefore, in the present example embodiment, at least one of a spatial region where surveillance is to be conducted and a time slot when surveillance is to be conducted is adjusted on the basis of the environmental information obtained on the basis of a video to be analyzed or information for identifying the video. Here, as described above, it can be said that, in a place having a large number of blind spots, or the like, the risk of an accident or a crime increases. The information processing apparatus 10 of the present example embodiment uses the environmental information indicating the presence or absence of an object that causes a blind spot, the number of such objects, or the like in a process of identifying a spatial region where surveillance is to be conducted or a time slot when surveillance is to be conducted. Thereby, according to the present example embodiment, it is possible to more accurately identify a spatial region where intensive surveillance is to be conducted or a time slot when intensive surveillance is to be conducted. Note that, in a case where the environmental information is acquired from a video, the information processing apparatus 10 of the present example embodiment may acquire the environmental information from a video at the current time or a video in the latest time range, and may acquire the environmental information by determining the environmental tendency of the place from the past video.

Fourth Example Embodiment

The present example embodiment has the same functional configuration and hardware configuration as those of the first example embodiment to the third example embodiment, except for the following points. Note that the following shows an example in which the configuration of the first example embodiment is used as a base.

[Functional Configuration]

Figure 13:
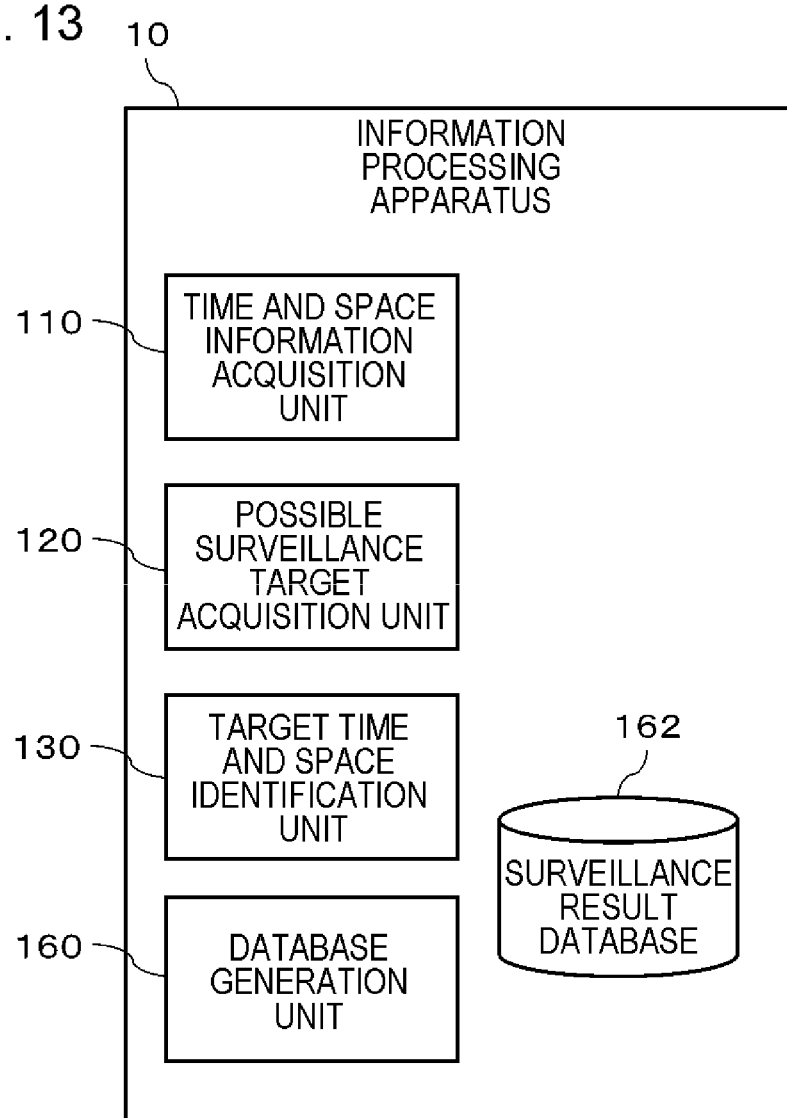
FIG. 13 is a diagram conceptually illustrating a functional configuration of an information processing apparatus of a fourth example embodiment.

FIG. 13 is a diagram conceptually illustrating a functional configuration of an information processing apparatus 10 of a fourth example embodiment. The information processing apparatus 10 of the present example embodiment further includes a database generation unit 160, in addition to the configuration of the first example embodiment. The information processing apparatus 10 of the present example embodiment further stores a program for realizing a function of the database generation unit 160 described later in the storage 104. The processor 102 executes this program module, to thereby further realize the function of the database generation unit 160.

The database generation unit 160 accepts an input of a result of surveillance according to at least one of a spatial region where surveillance is to be conducted or a time slot when surveillance is to be conducted, and makes a database of the input result. The database generation unit 160 communicates with an input device of the information processing apparatus 10 or another apparatus, and accepts the input of the result of surveillance. The "result of surveillance work" includes, for example, information such as the number of persons who have performed surveillance work in a spatial region where surveillance is to be conducted or at a time slot when surveillance is to be conducted which is identified by the target time and space identification unit 130 or a sojourn time thereof, the number of possible criminals or possible victims found within the spatial region, the number of accidents or crimes found within the spatial region, or the like. In a case where such input information is accepted, the database generation unit 160 stores the input information in a surveillance result database 162.

The target time and space identification unit 130 of the present example embodiment uses information of a database generated and managed by the database generation unit 160, to thereby adjust at least one of a spatial region where surveillance is to be conducted or a time slot when surveillance is to be conducted, using a databased result. For example, in a certain spatial region, the number of possible criminals or possible victims or the number of accidents or crimes is assumed not to change regardless of the presence or absence of surveillance and the length of surveillance time. Such a spatial region is considered to be a spatial region or the like having little benefit resulting from surveillance work. On the other hand, in a certain spatial region, the number of possible criminals or possible victims or the number of accidents or crimes is assumed to show more than a certain amount of fluctuation, depending on the presence or absence of surveillance work or the length of surveillance time. Such a spatial region is considered to be a spatial region or the like having much benefit resulting from surveillance work. The target time and space identification unit 130 can analyze the information stored in the surveillance result database 162 in this manner, to thereby identify a more effective surveillance plan (spatial region where surveillance is to be conducted and time slot when surveillance is to be conducted).

Advantageous Effect

Hereinbefore, in the present example embodiment, a result obtained by performing surveillance work is databased, and the databased result is used in a process of identifying a spatial region where surveillance is to be conducted or a time slot when surveillance is to be conducted. Thereby, according to the present example embodiment, for example, a person in charge of surveillance work can draft a more effective deployment plan, in accordance with the effect of surveillance work which is actually obtained.

Fifth Example Embodiment

In the present example embodiment, an embodiment is illustrated in which a result obtained by performing surveillance work is utilized in the prediction of the high-risk time and space.

[Functional Configuration and Hardware Configuration]

As is the case with the fourth example embodiment, an information processing apparatus 10 of the present example embodiment has a functional configuration as shown in FIG. 13. In addition, as is the case with each example embodiment, the information processing apparatus 10 of the present example embodiment has a hardware configuration as shown in FIG. 2.

For example, similarly to Patent Document 2 or Patent Document 3, the time and space information acquisition unit 110 of the present example embodiment predicts the high-risk time and space using the history of a crime or an accident occurring in the past, or the like, and acquires the high-risk time and space information. The time and space information acquisition unit 110 may further use the characteristics of each spatial region (such as the average amount of traffic of persons or vehicles according to time slots or the number of blind spots present in the spatial region), as parameters when the high-risk time and space are predicted. In addition, the time and space information acquisition unit 110 of the present example embodiment acquires a result of surveillance work stored in the surveillance result database 162, as feedback information. The time and space information acquisition unit 110 further uses the acquired feedback information in a process of predicting the high-risk time and space information.

As described above, information including information such as the number of persons who have performed surveillance work in a spatial region where surveillance is to be conducted or at a time slot when surveillance is to be conducted which is identified by the target time and space identification unit 130 or a sojourn time thereof, the number of possible criminals or possible victims found within the spatial region, the number of accidents or crimes found within the spatial region, or the like is stored in the surveillance result database 162. The information stored in the surveillance result database 162 may show a result of actual risk in the time and space predicted to be "high risk". That is, the information (feedback information) stored in the surveillance result database 162 can be used as adjustment parameters for predicting (adjusting) the high-risk time and space more accurately. Here, the feedback information which is acquired by the time and space information acquisition unit 110 may be part of information (for example, information of a specified period (such as several weeks or several months)) stored in the surveillance result database 162, and may be all information stored in the surveillance result database 162.

Advantageous Effect

Hereinbefore, in the present example embodiment, the result obtained by performing surveillance work is databased, and the databased result (feedback information) is used as adjustment parameters in a process of predicting the high-risk time and space. According to the present example embodiment, the high-risk time and space can be more accurately predicted using a result obtained by actually performing surveillance work.

Hereinbefore, although the example embodiments of the present invention have been set forth with reference to the accompanying drawings, the example embodiments are merely illustrative of the present invention, and a combination of the example embodiments above or various configurations other than those stated above can be adopted.

Hereinafter, examples of reference forms are appended.

1. An information processing apparatus including:
   a time and space information acquisition unit that acquires high-risk time and space information indicating a spatial region with an increased possibility of an accident occurring or of a crime being committed and a corresponding time slot;

a possible surveillance target acquisition unit that identifies a video to be analyzed from among a plurality of videos generated by capturing an image of each of a plurality of places, on the basis of the high-risk time and space information, and analyzes the identified video to acquire information of a possible surveillance target; and a target time and space identification unit that identifies, from among the spatial region and the time slot indicated by the high-risk time and space information, at least one of a spatial region where surveillance is to be conducted which is at least a portion of the spatial region or a time slot when surveillance is to be conducted, on the basis of the information of the possible surveillance target.

2. The information processing apparatus according to 1, further including a possible victim information acquisition unit that acquires information of a possible victim of an accident or a crime, wherein the target time and space identification unit adjusts at least one of the spatial region where surveillance is to be conducted or the time slot when surveillance is to be conducted using the information of the possible victim.

3. The information processing apparatus according to 2, wherein the possible victim information acquisition unit selects the possible victim on the basis of information of an accident or a crime pertaining to the information of the possible surveillance target.

4. The information processing apparatus according to any one of 1 to 3, further including an environmental information acquisition unit that acquires environmental information of a region included in the identified video, on the basis of the identified video or information for identifying a place of the video, wherein the target time and space identification unit adjusts at least one of the spatial region where surveillance is to be conducted or the time slot when surveillance is to be conducted using the environmental information.

5. The information processing apparatus according to any one of 1 to 4, further including a databasing unit that accepts an input of a result of surveillance according to at least one of the spatial region where surveillance is to be conducted or the time slot when surveillance is to be conducted, and stores the input result in a database.

6. The information processing apparatus according to 5, wherein the target time and space identification unit adjusts at least one of the spatial region where surveillance is to be conducted or the time slot when surveillance is to be conducted using the databased result.

7. The information processing apparatus according to 5, wherein the time and space information acquisition unit acquires the databased result as feedback information, and uses the acquired feedback information in a process of predicting a spatial region and a time slot with an increased possibility of an accident occurring or of a crime being committed, to acquire the high-risk time and space information.

8. The information processing apparatus according to any one of 1 to 7, wherein the possible surveillance target acquisition unit recognizes a person within a range of the identified video, collates the recognized person with an existing person under surveillance in a storage unit that registers information of the person under surveillance, and identifies a corresponding person in the storage unit as the possible surveillance target.

9. The information processing apparatus according to any one of 1 to 8, wherein in a case where as a result of analyzing the identified video a person estimated to be identical is detected in a place of a predetermined range a predetermined number of times or more or for a predetermined length of time or more, the possible surveillance target acquisition unit identifies the person as the possible surveillance target.

10. The information processing apparatus according to any one of 1 to 9, wherein in a case where as a result of analyzing the identified video a two-wheeled or three-wheeled vehicle with two people thereon which is estimated to be identical is detected in a place of a predetermined range a predetermined number of times or more or for a predetermined length of time or more, the possible surveillance target acquisition unit identifies the two-wheeled or three-wheeled vehicle as the possible surveillance target.

11. The information processing apparatus according to any one of 1 to 10, wherein the possible surveillance target acquisition unit recognizes a vehicle within a range of the identified video, identifies a possessor of the recognized vehicle by reference to a storage unit that registers information including a possessor of each vehicle, collates the identified possessor with an existing person under surveillance in a storage unit that registers information of the person under surveillance, and identifies a corresponding person in the storage unit as the possible surveillance target.

12. The information processing apparatus according to any one of 1 to 11, wherein the possible surveillance target acquisition unit recognizes a vehicle within a range of the identified video, collates the recognized vehicle with a vehicle possessed by a person who has caused a traffic accident or a person who has violated traffic rules before in a storage unit that registers information of the vehicle, and identifies a corresponding vehicle in the storage unit as the possible surveillance target.

13. An information processing method executed by a computer, the method including:

acquiring high-risk time and space information indicating a spatial region with an increased possibility of an accident occurring or of a crime being committed and a corresponding time slot;

identifying a video to be analyzed from among a plurality of videos generated by capturing an image of each of a plurality of places, on the basis of the high-risk time and space information, and analyzing the identified video to acquire information of a possible surveillance target; and identifying, from among the spatial region and the time slot indicated by the high-risk time and space information, at least one of a spatial region where surveillance is to be conducted which is at least a portion of the spatial region or a time slot when surveillance is to be conducted, on the basis of the information of the possible surveillance target.

14. The information processing method executed by the computer according to 13, the method further including:
   acquiring information of a possible victim of an accident or a crime; and
   adjusting at least one of the spatial region where surveillance is to be conducted or the time slot when surveillance is to be conducted using the information of the possible victim.

15. The information processing method executed by the computer according to 14, the method further including selecting the possible victim on the basis of information of an accident or a crime pertaining to the information of the possible surveillance target.

16. The information processing method executed by the computer according to any one of 13 to 15, the method further including:
   acquiring environmental information of a region included in the identified video, on the basis of the video or information for identifying a place of the video; and
   adjusting at least one of the spatial region where surveillance is to be conducted or the time slot when surveillance is to be conducted using the environmental information.

17. The information processing method executed by the computer according to any one of 13 to 16, the method further including accepting an input of a result of surveillance according to at least one of the spatial region where surveillance is to be conducted or the time slot when surveillance is to be conducted, and store the input result in a database.

18. The information processing method executed by the computer according to 17, the method further including adjusting at least one of the spatial region where surveillance is to be conducted or the time slot when surveillance is to be conducted using the databased result.

19. The information processing method executed by the computer according to 17, the method further including:
   acquiring the databased result as feedback information; and
   using the acquired feedback information in a process of predicting a spatial region and a time slot with an increased possibility of an accident occurring or of a crime being committed, to acquire the high-risk time and space information.

20. The information processing method executed by the computer according to any one of 13 to 19, the method further including:
   recognizing a person within a range of the identified video;
   collating the recognized person with an existing person under surveillance in a storage unit that registers information of the person under surveillance; and
   identifying a corresponding person in the storage unit as the possible surveillance target.

21. The information processing method executed by the computer according to any one of 13 to 20, the method further including identifying, in a case where as a result of analyzing the identified video a person estimated to be identical is detected in a place of a predetermined range a predetermined number of times or more or for a predetermined length of time or more, the person as the possible surveillance target.

22. The information processing method executed by the computer according to any one of 13 to 21, the method further including identifying, in a case where as a result of analyzing the identified video a two-wheeled or three-wheeled vehicle with two people thereon which is estimated to be identical is detected in a place of a predetermined range a predetermined number of times or more or for a predetermined length of time or more, the two-wheeled or three-wheeled vehicle as the possible surveillance target.

23. The information processing method executed by the computer according to any one of 13 to 22, the method further including:
   recognizing a vehicle within a range of the identified video;
   identifying a possessor of the recognized vehicle by reference to a storage unit that registers information including a possessor of each vehicle;
   collating the identified possessor with an existing person under surveillance in a storage unit that registers information of the person under surveillance; and
   identifying a corresponding person in the storage unit as the possible surveillance target.

24. The information processing method executed by the computer according to any one of 13 to 23, the method further including:
   recognizing a vehicle within a range of the identified video;
   collating the recognized vehicle with a vehicle possessed by a person who has caused a traffic accident or a person who has violated traffic rules before in a storage unit that registers information of the vehicle; and
   identifying a corresponding vehicle in the storage unit as the possible surveillance target.

25. A program for causing a computer to function as:
   a time and space information acquisition unit that acquires high-risk time and space information indicating a spatial region with an increased possibility of an accident occurring or of a crime being committed and a corresponding time slot;
   a possible surveillance target acquisition unit that identifies a video to be analyzed from among a plurality of videos generated by capturing an image of each of a plurality of places, on the basis of the high-risk time and space information, and analyzes the identified video to acquire information of a possible surveillance target; and
   a target time and space identification unit that identifies, from among the spatial region and the time slot indicated by the high-risk time and space information, at least one of a spatial region where surveillance is to be conducted which is at least a portion of the spatial region or a time slot when surveillance is to be conducted, on the basis of the information of the possible surveillance target.

26. The program according to 25, causing the computer to further function as:
   a possible victim information acquisition unit that acquires information of a possible victim of an accident or a crime; and
   a unit that adjusts at least one of the spatial region where surveillance is to be conducted or the time slot when surveillance is to be conducted using the information of the possible victim.

27. The program according to 26, causing the computer to further function as a unit that selects the possible victim on the basis of information of an accident or a crime pertaining to the information of the possible surveillance target.

28. The program according to any one of 25 to 27, causing the computer to further function as:

an environmental information acquisition unit that acquires environmental information of a region included in the identified video, on the basis of the identified video or information for identifying a place of the video; and a unit that adjusts at least one of the spatial region where surveillance is to be conducted or the time slot when surveillance is to be conducted using the environmental information.

29. The program according to any one of 25 to 28, causing the computer to further function as a databasing unit that accepts an input of a result of surveillance according to at least one of the spatial region where surveillance is to be conducted or the time slot when surveillance is to be conducted, and stores the input result in a database.

30. The program according to 29, causing the computer to further function as a unit that adjusts at least one of the spatial region where surveillance is to be conducted or the time slot when surveillance is to be conducted using the databased result.

31. The program according to 29, causing the computer to further function as:
   a unit that acquires the databased result as feedback information; and
   a unit that uses the acquired feedback information in a process of predicting a spatial region and a time slot with an increased possibility of an accident occurring or of a crime being committed, to acquire the high-risk time and space information.

32. The program according to any one of 25 to 31, causing the computer to further function as:
   a unit that recognizes a person within a range of the identified video;
   a unit that collates the recognized person with an existing person under surveillance in a storage unit that registers information of the person under surveillance; and
   a unit that identifies a corresponding person in the storage unit as the possible surveillance target.

33. The program according to any one of 25 to 32, causing the computer to further function as a unit that identifies, in a case where as a result of analyzing the identified video a person estimated to be identical is detected in a place of a predetermined range a predetermined number of times or more or for a predetermined length of time or more, the person as the possible surveillance target.

34. The program according to any one of 25 to 33, causing the computer to function as
   a unit that identifies, in a case where as a result of analyzing the identified video a two-wheeled or three-wheeled vehicle with two people thereon which is estimated to be identical is detected in a place of a predetermined range a predetermined number of times or more or for a predetermined length of time or more, the two-wheeled or three-wheeled vehicle as the possible surveillance target.

35. The program according to any one of 25 to 34, causing the computer to further function as:
   a unit that recognizes a vehicle within a range of the identified video;
   a unit that identifies a possessor of the recognized vehicle by reference to a storage unit that registers information including a possessor of each vehicle;
   a unit that collates the identified possessor with an existing person under surveillance in a storage unit that registers information of the person under surveillance; and
   a unit that identifies a corresponding person in the storage unit as the possible surveillance target.

36. The program according to any one of 25 to 35, causing the computer to function as:
   a unit that recognizes a vehicle within a range of the identified video;
   a unit that collates the recognized vehicle with a vehicle possessed by a person who has caused a traffic accident or a person who has violated traffic rules before in a storage unit that registers information of the vehicle; and
   a unit that identifies a corresponding vehicle in the storage unit as the possible surveillance target.

37. An information processing apparatus including:
   a time and space information acquisition unit that acquires high-risk time and space information indicating a spatial region with an increased possibility of an accident occurring or of a crime being committed and a corresponding time slot;
   a possible victim information acquisition unit that identifies a video to be analyzed from among a plurality of videos generated by capturing an image of each of a plurality of places, on the basis of the high-risk time and space information, and analyzes the identified video to acquire information of a possible victim of an accident or a crime; and
   a target time and space identification unit that identifies, from among the spatial region and the time slot indicated by the high-risk time and space information, at least one of a spatial region where surveillance is to be conducted which is at least a portion of the spatial region or a time slot when surveillance is to be conducted, on the basis of the information of the possible victim.

38. An information processing method executed by a computer, the method including:
   acquiring high-risk time and space information indicating a spatial region with an increased possibility of an accident occurring or of a crime being committed and a corresponding time slot;
   identifying a video to be analyzed from among a plurality of videos generated by capturing an image of each of a plurality of places, on the basis of the high-risk time and space information, and analyzing the identified video to acquire information of a possible victim of an accident or a crime; and
   identifying, from among the spatial region and the time slot indicated by the high-risk time and space information, at least one of a spatial region where surveillance is to be conducted which is at least a portion of the spatial region or a time slot when surveillance is to be conducted, on the basis of the information of the possible victim.

39. A program for causing a computer to function as:
   a time and space information acquisition unit that acquires high-risk time and space information indicating a spatial region with an increased possibility of an accident occurring or of a crime being committed and a corresponding time slot;
   a possible victim information acquisition unit that identifies a video to be analyzed from among a plurality of videos generated by capturing an image of each of a plurality of places, on the basis of the high-risk time and space information, and analyzes the identified video to acquire information of a possible victim of an accident or a crime; and a target time and space identification unit that identifies, from among the spatial region and the time slot indicated by the high-risk time and space information, at least one of a spatial region where surveillance is to be conducted which is at least a portion of the spatial region or a time slot when surveillance is to be conducted, on the basis of the information of the possible victim.

This application is based on Japanese Patent Application No. 2016-015713 filed on Jan. 29, 2016, the content of which is incorporated hereinto by reference.

The invention claimed is:

1. An information processing apparatus analyzing at least one video captured by at least one camera, the information processing apparatus comprising:
   at least one memory storing instructions; and
   at least one processor configured to execute the instructions to:
      acquire high-risk time and space information indicating a spatial region with an increased possibility of an accident occurring or of a crime being committed and at least one of a corresponding with time slot and a corresponding date;
      identify, from among the spatial region and the time slot indicated by the high-risk time and space information, a spatial region where surveillance is to be conducted which is at least a portion of the spatial region and a time slot when surveillance is to be conducted, on the basis of the video;
      identify a past video in the spatial region and time slot indicated by high-risk time and space information as an analysis target, analyze the analysis target, and acquire information on a possible surveillance target; and
      regulate, in accordance with a number of pieces of information on the possible surveillance target, at least one of the priority of a place where a surveillance is to be conducted and a time when surveillance is to be conducted.

2. The information processing apparatus according to claim 1, wherein the processor is further configured to:
   acquire information of a possible victim of an accident or a crime; and
   adjust at least one of the spatial region where surveillance is to be conducted or the time slot when surveillance is to be conducted using the information of the possible victim.

3. The information processing apparatus according to claim 1, wherein the processor is further configured to:
   acquire environmental information of a region included in the video, on the basis of the identified video or information for identifying a place of the video; and
   adjust at least one of the spatial region where surveillance is to be conducted or the time slot when surveillance is to be conducted using the environmental information.

4. The information processing apparatus according to claim 1, wherein the processor is further configured to:
   accept an input of a result of surveillance according to at least one of the spatial region where surveillance is to be conducted or the time slot when surveillance is to be conducted, and
   store the input result in a database.

5. An information processing method performed by a computer analyzing at least one video captured by at least one camera, the information processing method comprising:
   acquiring high-risk time and space information indicating a spatial region with an increased possibility of an accident occurring or of a crime being committed and at least one of a corresponding with time slot and a corresponding date;
   identifying, from among the spatial region and the time slot indicated by the high-risk time and space information, a spatial region where surveillance is to be conducted which is at least a portion of the spatial region and a time slot when surveillance is to be conducted, on the basis of the video;
   identifying a past video in the spatial region and time slot indicated by high-risk time and space information as an analysis target, analyzing the analysis target, and acquiring information on a possible surveillance target; and
   regulating, in accordance with a number of pieces of information on the possible surveillance target, at least one of the priority of a place where a surveillance is to be conducted and a time when surveillance is to be conducted.

6. The information processing method according to claim 5, further comprising:
   acquiring information of a possible victim of an accident or a crime; and
   adjusting at least one of the spatial region where surveillance is to be conducted or the time slot when surveillance is to be conducted using the information of the possible victim.

7. The information processing method according to claim 5, further comprising:
   acquiring environmental information of a region included in the video, on the basis of the identified video or information for identifying a place of the video; and
   adjusting at least one of the spatial region where surveillance is to be conducted or the time slot when surveillance is to be conducted using the environmental information.

8. The information processing method according to claim 5, further comprising:
   accepting an input of a result of surveillance according to at least one of the spatial region where surveillance is to be conducted or the time slot when surveillance is to be conducted, and
   storing the input result in a database.

9. A non-transitory computer-readable medium storing a program for causing a computer analyzing at least one video captured by at least one camera to perform operations, the operations comprising:
   at least one memory storing instructions; and
   at least one processor configured to execute the instructions to:
      acquiring high-risk time and space information indicating a spatial region with an increased possibility of an accident occurring or of a crime being committed and at least one of a corresponding with time slot and a corresponding date;
      identifying, from among the spatial region and the time slot indicated by the high-risk time and space information, a spatial region where surveillance is to be conducted which is at least a portion of the spatial region and a time slot when surveillance is to be conducted, on the basis of the video;
      identifying a past video in the spatial region and time slot indicated by high-risk time and space information as an analysis target, analyzing the analysis target, and acquiring information on a possible surveillance target; and regulating, in accordance with a number of pieces of information on the possible surveillance target, at least one of the priority of a place where a surveillance is to be conducted and a time when surveillance is to be conducted.

10. The non-transitory computer-readable medium according to claim 9, wherein the operations further comprise:
    acquiring information of a possible victim of an accident or a crime; and
    adjusting at least one of the spatial region where surveillance is to be conducted or the time slot when surveillance is to be conducted using the information of the possible victim.

11. The non-transitory computer-readable medium according to claim 9, wherein the operations further comprise:
    acquiring environmental information of a region included in the video, on the basis of the identified video or information for identifying a place of the video; and
    adjusting at least one of the spatial region where surveillance is to be conducted or the time slot when surveillance is to be conducted using the environmental information.

12. The non-transitory computer-readable medium according to claim 9, wherein the operations further comprise:
    accepting an input of a result of surveillance according to at least one of the spatial region where surveillance is to be conducted or the time slot when surveillance is to be conducted, and
    storing the input result in a database.

* * * * *